United States Patent
Fujiwara et al.

(10) Patent No.: US 8,544,887 B2
(45) Date of Patent: Oct. 1, 2013

(54) STEERING COLUMN SUPPORT APPARATUS AND ASSEMBLY METHOD

(75) Inventors: Takeshi Fujiwara, Gunma (JP); Kiyoshi Sadakata, Gunma (JP); Toru Segawa, Gunma (JP); Takahiro Minamigata, Gunma (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 13/386,804

(22) PCT Filed: Nov. 17, 2011

(86) PCT No.: PCT/JP2011/076498
§ 371 (c)(1),
(2), (4) Date: Mar. 16, 2012

(87) PCT Pub. No.: WO2012/090616
PCT Pub. Date: Jul. 5, 2012

(65) Prior Publication Data
US 2012/0299281 A1 Nov. 29, 2012

(30) Foreign Application Priority Data

Dec. 28, 2010 (JP) ................ 2010-292643
Dec. 28, 2010 (JP) ................ 2010-293110

(51) Int. Cl.
*B62D 1/19* (2006.01)
(52) U.S. Cl.
USPC .............. 280/777; 280/779; 74/492
(58) Field of Classification Search
USPC .............. 280/777, 779, 780, 750; 74/492
See application file for complete search history.

(56) References Cited

U.S. PATENT DOCUMENTS

| | | | | |
|---|---|---|---|---|
| 6,530,600 | B1 * | 3/2003 | Marxer et al. | 280/777 |
| 7,455,320 | B2 * | 11/2008 | Imamura et al. | 280/777 |
| 2008/0238070 | A1 * | 10/2008 | Bodtker | 280/777 |

FOREIGN PATENT DOCUMENTS

| JP | 51-121929 U | | 8/1975 |
|---|---|---|---|
| JP | 56-25981 Y2 | | 6/1981 |
| JP | 60-169365 A | | 9/1985 |
| JP | 2000-006821 A | | 1/2000 |
| JP | 2005-219641 A | | 8/2005 |
| JP | 2005219641 A | * | 8/2005 |

* cited by examiner

*Primary Examiner* — Keith Frisby
(74) *Attorney, Agent, or Firm* — Miles & Stockbridge P.C.

(57) ABSTRACT

Construction of a steering column support apparatus is achieved that is capable of simplifying tuning for stabilizing the forward displacement of the steering wheel 1 during a secondary collision, and lowering and stabilizing the break away load of the steering column 6c. A connecting bracket 30 is used that comprises an installation plate section 31 that connects and fastens to the portion on the top surface of the top plate section 23 of a bracket 12b on the column side which is exposed on the inside of a locking notch 28, a raised section 32 that rises upward from the installation plate section 31, and a restraining plate section 33 that is bent and extends outward from the edge on the top end of the raised section 32. With the installation plate section 31 connected and fastened to the top plate section 23, the portion of a bracket on the vehicle side 11 that surrounds the locking cutout section 28 is elastically held between the top surface of the top plate section 23 and the bottom surface of the restraining plate section 33, and the bracket 12*b* on the column side is supported by the bracket 11 on the vehicle side so as to be able to displace in the forward direction during a secondary collision.

9 Claims, 19 Drawing Sheets

STEERING COLUMN SUPPORT APPARATUS AND ASSEMBLY METHOD

FIELD OF THE INVENTION

The present invention relates to an improvement of a steering column support apparatus that supports a steering column such that the steering column can displace in the forward direction with respect to the vehicle body in order to enable the steering wheel to displace in the forward direction while absorbing impact energy that is applied to the steering wheel from the body of the driver during an impact collision.

BACKGROUND ART

A steering apparatus for an automobile, as illustrated in FIG. 17, is constructed so that rotation of the steering wheel 1 is transmitted to an input shaft 3 of a steering gear unit 2, and as this input shaft 3 turns, the input shaft 3 pushes or pulls a pair of left and right tie rods 4, which apply a steering angle to the front wheels of the automobile. In order to accomplish this, the steering wheel 1 is fastened to and supported by the rear end section of a steering shaft 5, and this steering shaft 5 is inserted in the axial direction through a cylindrical shaped steering column 6, and is supported by this steering column 6 such that it can rotate freely. The front end section of the steering shaft 5 is connected to the rear end section of an intermediate shaft 8 via a universal joint 7, and the front end section of this intermediate shaft 8 is connected to the input shaft 3 via a different universal joint 9. The intermediate shaft 8 is constructed so that it can transmit the torque and it can contract over its entire length due to an impact load. Therefore, when the steering gear unit 2 is displaced in the backward direction due to a primary collision between an automobile and another automobile or the like, that displacement is absorbed, which prevents the steering wheel 1 from displacing in the backward direction via the steering shaft 5 and hitting the body of the driver.

In such a steering apparatus for an automobile, for providing additional protection of the driver, it is necessary to adopt a structure that allows the steering wheel 1 to displace forward while absorbing impact energy when an accident occurs. After the primary collision, a secondary collision occurs when the body of the driver collides with the steering wheel 1. As this kind of construction, construction is known (refer to JP51-121929(U), JP2005-219641(A), JP2000-6821 (A), JP56-25981(U), and JP60-169365(A)) and widely used in which an energy absorbing member, which absorbs an impact load by plastically deforming, is provided between the vehicle body and a member that supports the steering column 6 that supports the steering wheel 1 with respect to the vehicle body so that it can break away in the forward direction due to an impact load in the forward direction during a secondary collision, and displaces in the forward direction together with the steering column 6.

FIG. 18 to FIG. 20 illustrate an example of this kind of steering apparatus. A housing 10, which houses the reduction gear and the like of an electric power steering apparatus, is fastened to the front end section of a steering column 6a. A steering shaft 5a is supported on the inside of the steering column 6a such that it can only rotate freely, and a steering wheel 1 (see FIG. 17) can be fastened to the portion on the rear end section of this steering shaft 5a that protrudes from the opening on the rear end of the steering column 6a. The steering column 6a and the housing 10 are supported by a bracket on the vehicle side (not shown) having a flat shape that is fastened to the vehicle body so that they can break away in the forward direction due to an impact load in the forward direction.

To accomplish this, a bracket 12 on the column side that is supported in the middle section of the steering column 6a and a bracket 13 on the housing side that is supported by the housing 10 are supported with respect to the vehicle body so that they both can break away in the forward direction due to an impact load in the forward direction. These brackets 12, 13 both comprise installation plate sections 14a, 14b at one or two locations, and notch sections 15a, 15b are formed in these installation plate sections 14a, 14b so that they are open on the rear end edges. With these notch sections 15a, 15b covered, sliding plates 16a, 16b are assembled in the portions of the brackets 12, 13 near both the left and right ends.

These sliding plates 16a, 16b are formed by bending thin metal plate such as carbon steel plate or stainless steel plate provided with a layer of a synthetic resin that slides easily, such as polyamide resin (nylon), polytetrafluoroethylene resin (PTFE) or the like on the surface into a U shape, having a top plate section and a bottom plate section that are connected by a connecting plate section. Through holes for inserting bolts or studs are formed in portions of the top and bottom plate sections that are aligned with each other. With these sliding plates 16a, 16b mounted on the installation plate sections 14a, 14b, the through holes are aligned with the notch sections 15a, 15b that are formed in these installation plate sections 14a, 14b.

The bracket 12 on the column side and the bracket 13 on the housing side are supported by the bracket 11 on the vehicle side by screwing nuts onto bolts or studs that are inserted through the notch sections 15a, 15b in the installation plate sections 14a, 14b and the through holes in the sliding plates 16a, 16b, and tightening the nuts. During a secondary collision, the bolts or studs come out from the notch sections 15a, 15b together with the sliding plates 16a, 16b, which allows the steering column 6a and the housing 10 to displace in the forward direction together with the bracket 12 on the column side, the bracket 13 on the housing side and the steering wheel 1.

Moreover, in the example in the figure, energy absorbing members 17 are provided between the bolts or studs and the bracket 12 on the column side. As this bracket 12 on the column side displaces in the forward direction, the energy absorbing members 17 plastically deform so as to absorb the impact energy that is transmitted to the bracket 12 on the column side by way of the steering shaft 5a and steering column 6a.

During a secondary collision, the bolts or studs, which was in a normal state shown in FIG. 19, come out from the notch sections 15a as shown in FIG. 20, which allows the bracket 12 on the column side to displace in the forward direction, and the steering column 6a displaces in the forward direction together with this bracket 12 on the column side. When this happens, the bracket 13 on the housing side also breaks away from the vehicle body, and is allowed to displace in the forward direction. As the bracket 12 on the column side displaces in the forward direction, the energy absorbing members 17 plastically deform and absorb the impact energy that is transmitted from the driver's body to the bracket 12 on the column side by way of the steering shaft 5a and the steering column 6a, which lessens the impact applied to the body of the driver.

In the case of the construction illustrated in FIG. 18 to FIG. 20, the bracket 12 on the column side is supported by the bracket 11 on the vehicle side at two locations, on both the right and left side, so that it can break away in the forward direction during a secondary collision. From the aspect of stable displacement in the forward direction without causing the steering wheel 1 to tilt, it is important during a secondary collision, that the pair of left and right support sections be disengaged at the same time. However, tuning in order that these support sections disengage at the same time is affected not only by resistance such as the friction resistance and the shear resistance to the disengagement of these support sections, but unbalance on the left and right of the inertial mass of the portion that displaces in the forward direction together with the steering column 6a, so takes time and trouble.

In order to stabilize the breaking away of the steering column in the forward direction during a secondary collision, applying the construction disclosed in JP51-121929(U) can be somewhat effective. FIG. 21 to FIG. 23 illustrate the construction disclosed in JP51-121929(U). In the case of this construction, a locking notch 18 is formed in the center section in the width direction of a bracket 11 on the vehicle side that is fastened to and supported by the vehicle body and that does not displace in the forward direction even during a secondary collision, and this locking notch 18 is open on the front end edge of the bracket 11 on the vehicle side. Moreover, a bracket 12a on the column side is supported by and fixed to the steering column 6a side such that it is able to displace in the forward direction together with a steering column 6b during a secondary collision.

Furthermore, both the left and right end sections of a locking capsule 19 that is fastened to this bracket 12a on the column side is locked in the locking notch 18. In other words, locking grooves 20 that are formed on both the left and right side surfaces of the locking capsule 19 engage with the edges on both the left and right sides of the locking notch 18. Therefore, the portions on both the left and right end sections of the locking capsule 19 that exist on the top side of the locking grooves 20 are positioned on the top side of the bracket 11 on the vehicle side on both side sections of the locking notch 18. When the bracket 11 on the vehicle side and the locking capsule 19 are engaged by way of the locking grooves 20 and the edges on both sides of the locking notch 18, locking pins 22 are pressure fitted into small locking holes 21a, 21b that are formed in positions in these members 11, 19 that are aligned with each other, joining the members 11, 19 together. These locking pins 22 are made using a relatively soft material such as an aluminum alloy, synthetic resin or the like that will shear under an impact load that is applied during a secondary collision.

When an impact load is applied during a secondary collision from the steering column 6b to the locking capsule 19 by way of the bracket 12a on the column side, these locking pins 22 shear. The locking capsule 19 then comes out in the forward direction from the locking notch 18, which allows the steering column 6b to displace in the forward direction together with the steering wheel 1 which is supported by this steering column 6b by way of the steering shaft 5.

In the case of the construction illustrated in FIG. 21 to FIG. 23, the engagement section between the locking capsule 19 that is fastened to the bracket 12a on the column side and the bracket 11 on the vehicle side is located at only one location in the center section in the width direction. Therefore, tuning for disengaging this engagement section and causing the steering wheel 1 to displace stably in the forward direction during a secondary collision becomes easy. Although this construction is effective from the aspect of allowing the steering column 6b to break away in the forward direction during a secondary collision with postural stability, in this construction, in order to more completely protect the driver by suppressing and stabilizing the load required for the disengagement (break away load), it is desired that the following points be improved.

In other words, in order to suppress the impact which is applied to the driver's body during a secondary collision more effectively, it is preferable to suppress the break away load so as to allow the steering column 6a to begin to be displaced in the forward direction at the instant of the secondary collision. In addition to facilitate the smooth displacement of the steering column 6a in the forward direction at the instant of the secondary collision, so as to suppress the impact which is applied to the driver's body who collides against the steering wheel 1, also after the beginning of the displacement of the steering column 6a, by plastically deforming an energy absorbing member 17 attached to the steering column 6a, the impact energy transmitted to the steering wheel 1 is absorbed, such that the protection for the driver can be enhanced.

In the case of the construction illustrated in FIG. 21 to FIG. 23, so as to allow the steering column 6a to begin to be displaced in the forward direction at the instant of the secondary collision, it is necessary to shear a plurality of locking pins. In order to shear these locking pins, a certain amount of the impact load is required, that is disadvantage for suppressing the break away load. On the other hand, in the construction shown in FIG. 18 to FIG. 20, tuning in order to stabilize the attitude of steering column 6a takes time and trouble, and a slight change in tightening torque of a bolt or the like for assembling the bracket 12 on the column side on the vehicle body side causes the break away load to vary widely, complicating the control of the tightening torque. For these reasons, in these conventional constructions, it is difficult to disengage this steering column 6a from the vehicle side in the forward direction with posture stability and decrease and stabilize the break away load.

RELATED ART LITERATURE

Patent Literature

[Patent Literature 1] JP51-121929(U)
[Patent Literature 2] JP2005-219641(A)
[Patent Literature 3] JP2000-6821(A)
[Patent Literature 4] JP56- 25981(U)
[Patent Literature 5] JPS60-169365(A)

SUMMARY OF THE INVENTION

Problems to be Resolved by the Invention

In consideration of the situation above, the object of the present invention is to provide construction of a steering column support apparatus that is able to simplify tuning for stabilizing forward displacement of the steering wheel during a secondary collision, lower and stabilize the break away load, and when necessary, prevent the steering wheel from dropping excessively during a secondary collision.

Means of Solving the Problems

The steering column support apparatus of the present invention comprises:

a bracket on the vehicle side that is fastened to the vehicle in at least two locations on both sides in the width direction, does not displace in the forward direction during a secondary collision and has a locking cutout section that extends in the forward/backward direction formed in the portion between the two locations on both sides in the axial direction;

a bracket on the column side that is located below the bracket on the vehicle side, supports the steering column, and comprises a top plate section on the top end section having a dimension in the width direction that is larger than the width dimension of the locking cutout section; and a connecting bracket that comprises an installation plate section that connects and fastens to a portion of the top surface of the top plate section which is exposed on the inside of the locking cutout section, a raised section that rises upward from the installation plate section, and a restraining plate section that is bent and extends to the outside from the edge on the top end of the raised section.

With the installation plate section connected and fastened to the top plate section, at least part of the restraining plate section elastically comes in contact with the top surface of the bracket on the vehicle side, and by holding part of the bracket on the vehicle side between the restraining plate section and the top plate section, the bracket on the column side is supported by the bracket on the vehicle side so as to be able to break away in the forward direction due to an impact load that is applied during a secondary collision.

Preferably, the connecting bracket is a resilient metal plate.

Preferably, there is a coating layer made of a low-friction material between both the top and bottom surfaces of the bracket on the vehicle side and the surfaces of the members that are in contact with these top and bottom surfaces before the occurrence of a secondary collision.

Preferably, the locking cutout section is constructed by a locking notch that is open on the edge of the front end of the bracket on the vehicle side, with the length in the forward/backward direction of this locking notch being longer than the length in the forward/backward direction of the bracket on the column side, so that even when the connecting bracket has displaced forward all the way together with the steering column and the bracket on the column side, at least part of the restraining plate section of the connecting bracket is located on the top side of the front end section of the bracket on the vehicle side, preventing the connecting bracket from dropping.

Furthermore, preferably, the bracket on the vehicle side is made using a metal plate, and a bent back section is formed by bending a portion of this metal plate that extends toward the rear beyond the edge on the rear end of the top plate section of the bracket on the column side downward toward the front so as to have a U-shaped cross section, with this bent back section wrapping around and holding the rear end section of the top plate section.

The connecting bracket can be formed as a single member, or can be formed as a plurality of members. In other words, the connecting bracket can comprise a main connecting bracket and a sub connecting bracket.

One of either the main connecting bracket or sub connecting bracket comprises an installation plate section that connects and fastens to the portion on the top surface of the top plate section that is exposed on the inside of the locking cutout section, a pair of raised sections that rise from the edges on both the left and right of the installation plate section, and a pair of left and right restraining plate sections that are bent and extend outward from the edges on the top ends of the raised sections.

The other connecting bracket, similar to the one connecting bracket, can comprise an installation plate section that connects and fastens to the portion on the top surface of the top plate section that is exposed on the inside of the locking cutout section, a pair of raised sections that rise from the edges on both the left and right of the installation plate section, and a pair of left and right restraining plate sections that are bent and extend outward from the edges on the top ends of the raised sections, however, can also be made using a flat-shaped member having a middle section and left and right end sections that function as a pair of left and right restraining plate sections.

In this form, with the installation plate section of the one connecting bracket connected and fastened to the top plate section, and the installation plate section of the other connecting bracket connected and fastened to the top plate section, or with the middle section fastened to the top plate section, the restraining plate sections of these connecting brackets are brought into elastic contact with the top surface of the bracket on the vehicle side, and part of the bracket on the vehicle side is held between these restraining plate sections and the top plate section.

Preferably, the one connecting bracket is the main connecting bracket.

When assembling a steering column support apparatus having a connecting bracket that comprises a main connecting bracket and a sub connecting bracket, preferably the following steps are performed.

(1) One of the connecting brackets is connected and fastened to the top plate section of the bracket on the column side, and after the bracket on the column side is supported by the bracket on the vehicle side, the break away load in the intermediate stage, which is the load which causes the bracket on the column side to start displacing in the forward direction with respect to the bracket on the vehicle side, is measured.

(2) The difference between the proper break away load, which is the load suitable for causing the bracket on the column side to start displacing in the forward/backward direction during a secondary collision, and the break away load in the intermediate stage is found.

(3) With the one connecting bracket connected and fastened to the top plate section of the bracket on the column side, the other connecting bracket is connected to the top plate section in order to increase the connection strength between the bracket on the column side and the bracket on the vehicle side by an amount that corresponds to the difference between break away loads.

It is possible to use the following methods as methods for increasing the connection strength between the bracket on the column side and the bracket on the vehicle side by an amount that corresponds to the difference between break away loads: (1) adjusting the connecting strength of the other connecting bracket to the top plate section; or (2) using a connecting bracket having a pair of restraining plate sections with elasticity that corresponds to the difference in break away loads.

Advantageous Effect of the Invention

With the steering column support of the present invention, construction is achieved that can simplify tuning for stabilizing the forward displacement of the steering wheel during a secondary collision, and lower and stabilize the break away load.

Simplifying tuning for stabilizing the forward displacement of the steering wheel during a secondary collision is achieved though engagement between the bracket on the vehicle side and the bracket on the column side in the portion between the two locations on both sides in the width direction where the bracket on the vehicle side is fastened to the vehicle side.

Lowering and stabilizing the break away load is achieved by using friction force that occurs by elastically holding the bracket on the vehicle side between the top plate section of the bracket on the column side and the restraining plate section of the connecting bracket to support the bracket on the column side with respect to the bracket on the vehicle side. The friction force can be adjusted easily by suitably selecting the material, thickness and the like of the connecting bracket, and changing the elasticity (rigidity) of the connecting bracket. Therefore, it is possible to lower and stabilize the break away load that is determined based on the friction force.

Particularly, when the connecting bracket is made using resilient metal plate, the restraining plate sections stabilize the force for holding the top surface of the bracket on the vehicle side, and thus fluctuation in the friction force is kept low. Furthermore, by using a sliding layer between both the top and bottom surfaces of the bracket on the vehicle side and the opposing surfaces, it is possible to lower the friction force, and thus it is possible to lower and stabilize the break away load.

Furthermore, by the connecting bracket comprising a main connecting bracket and a sub connecting bracket, it becomes easier to match the connection strength between the bracket on the column side and the bracket on the vehicle side to the proper break away load (design value) for the bracket on the column side during a secondary collision, so it becomes possible to more easily regulate the break away load for the bracket on the column side with good precision as designed.

BRIEF DESCRIPTION OF THE DRAWINGS

FIGS. 10A to 10D are half cross-sectional views illustrating the progress of the clinching process, and FIG. 10E is a partial enlarged view.

DETAILED DESCRIPTION OF THE INVENTION

EXAMPLE 1

Figure 1:
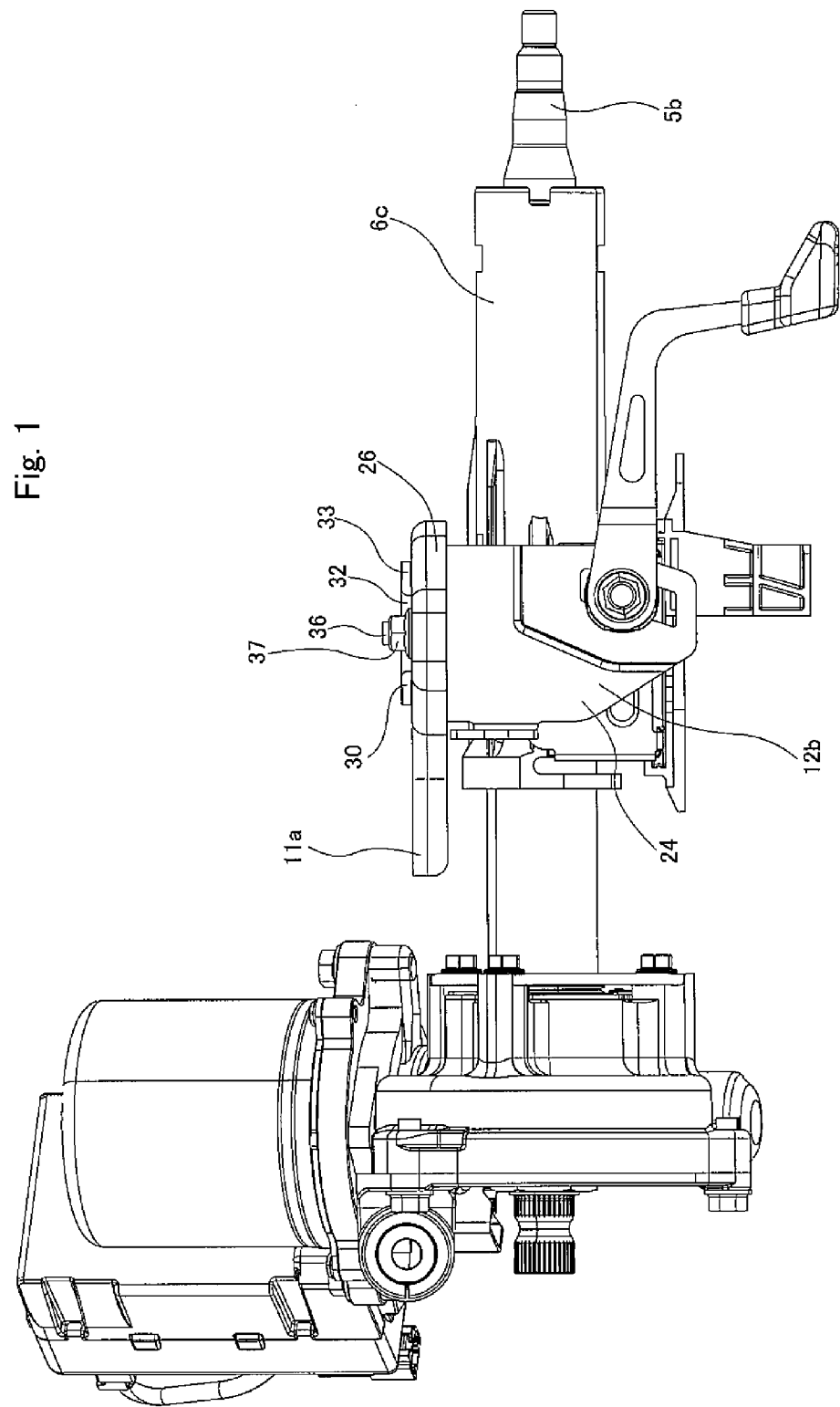
FIG. 1 is a side view illustrating a first example of an embodiment of the present invention.

FIG. 1 to FIG. 7 illustrate a first example of an embodiment of the present invention. The steering column support apparatus to which the present invention, including this example, is applied is basically comprises: a bracket 11a on the vehicle side that is fastened to the vehicle body in at least two locations on both sides in the width direction, does not displace in the forward direction during a secondary collision, and has a locking cutout section 28 that is located between the two locations on both sides in the width direction and that extends in the forward/backward direction; and a bracket 12b on the column side that is located on the underneath side of the bracket 11a on the vehicle side, supports the steering column 6c and has a top plate section 23 on the top end section that has a width dimension that is greater than the width dimension of the locking cutout section 28.

A feature of the present invention, including this example, is the construction for supporting the bracket 12b on the column side, which supports the steering column 6c, by the bracket 11a on the vehicle side, which is supported by the vehicle body, so that bracket 12b on the column side can break away in the forward direction due to impact that occurs during a secondary collision. Therefore, the construction and function of other parts, including the construction for supporting the steering column 6c by the bracket 12b on the column side, are the mostly same as a known steering column support apparatus, so that construction is illustrated only in the figures and any explanation is omitted, with the explanation below centering only on the construction for supporting the bracket 12b on the column side by the bracket 11a on the vehicle side and the assembly method for that construction.

The bracket 12b on the column side is made of metal plate such as carbon steel plate that has sufficient strength and rigidity, and is formed by bending that metal plate into a U shape that is open on the lower side. More specifically, the bracket 12b on the column side comprises a top plate section 23 that is formed on the top end section, and a pair of left and right support plate sections 24 that are bent and extend from the edges on both the left and right sides of the top plate section 23. The steering column 6c, with the steering shaft 5b supported on the inside such that the steering shaft 5b can rotate freely, is supported by the support plate sections 24 on both sides using known construction so that the up/down position and forward/backward position can be adjusted.

The bracket 12b on the column side is supported on the underneath side of the bracket 11a on the vehicle side so as to be able to displace (break away) in the forward direction due to an impact load that is applied to the bracket 12b on the column side during a secondary collision. The bracket 11a is also similarly made of metal plate such as carbon steel plate having sufficient strength and rigidity, and is formed by performing a punching process using a press on this metal plate raw material and performing a cutting process using a laser cutter or the like to form the bracket into a specified shape. In the example in the figure, the edge sections on both sides and the edge section on the rear end around a flat shaped base plate section 25 are bent to form a pair of left and right bent edge sections 26, which makes it possible to make the bracket both lightweight and rigid.

Figure 2:
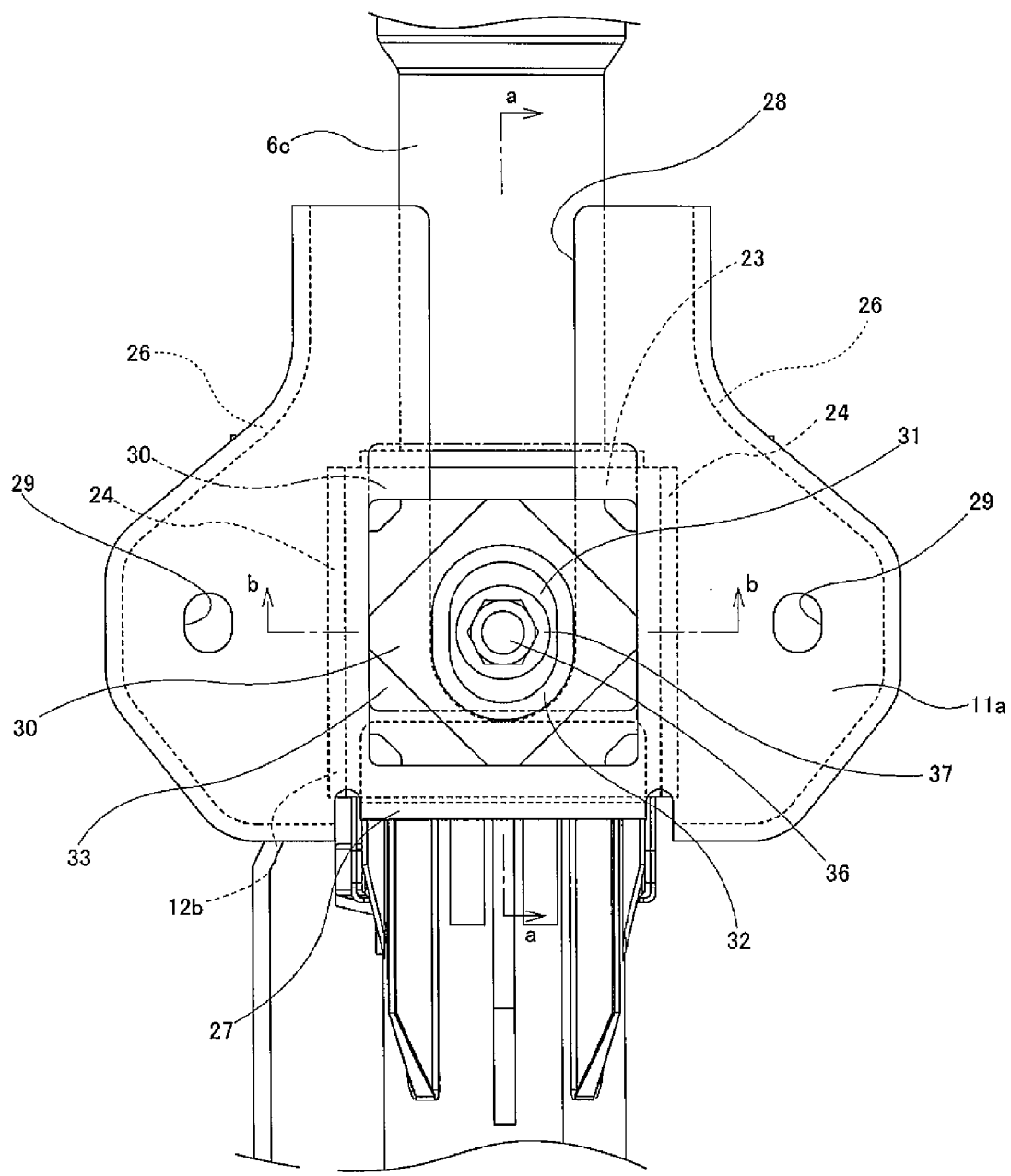
FIG. 2 is a top view illustrating the major parts of the center section in FIG. 1 as seen from above.
Figure 3:
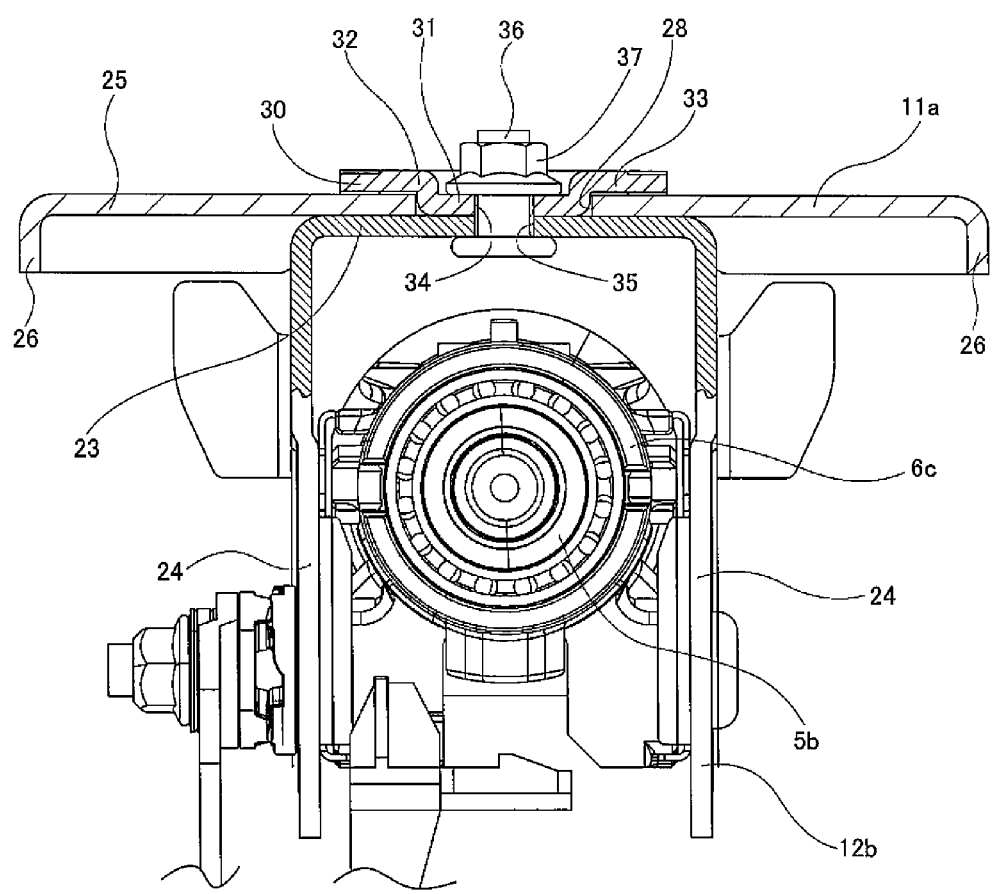
FIG. 3 is an end view as seen from the right in FIG. 1, with part cut away or omitted.
Figure 4:
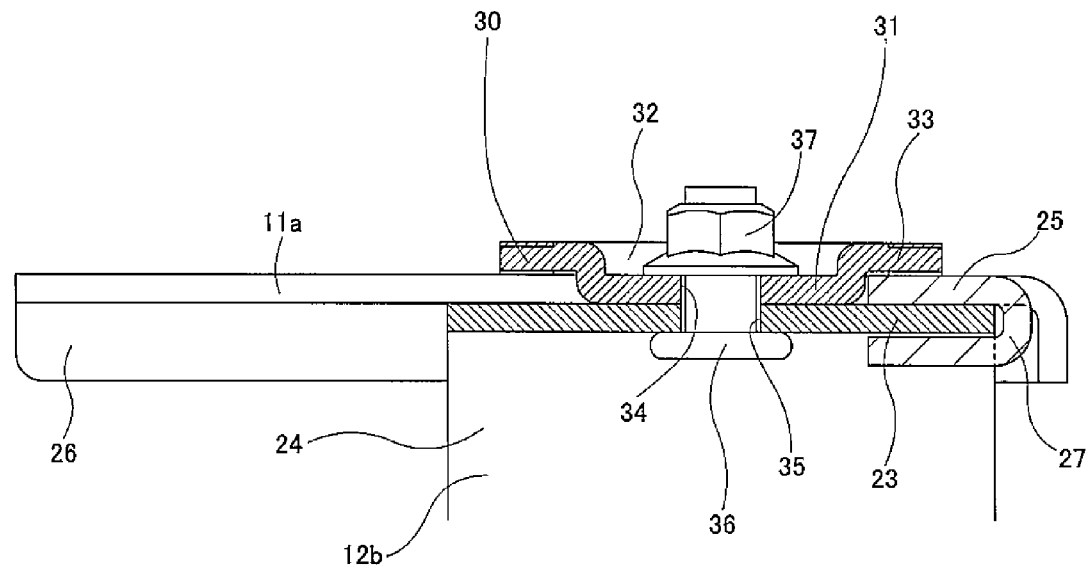
FIG. 4 is a cross-sectional view of section a-a in FIG. 2
Figure 5:
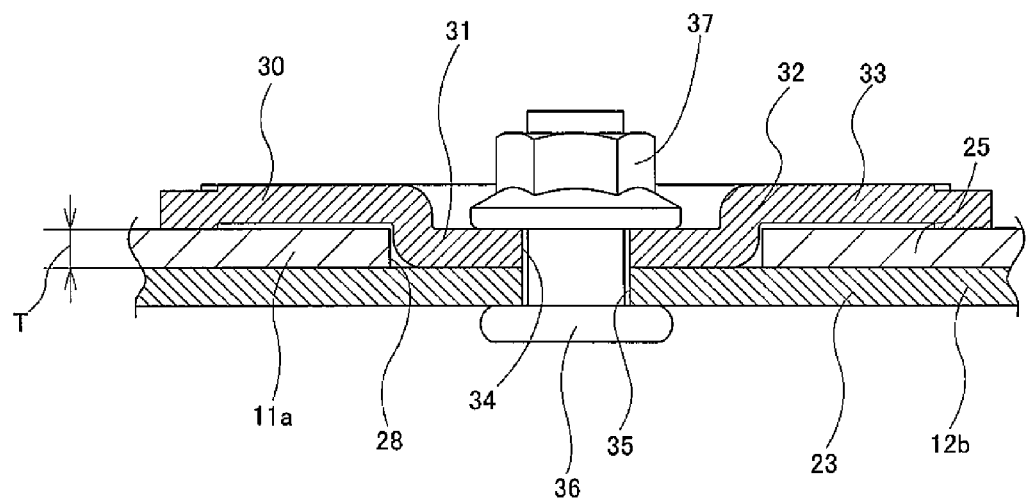
FIG. 5 is a cross-sectional view of section b-b in FIG. 2.

In this example, as illustrated in FIG. 2 and FIG. 4, a bent back section 27 is formed on the rear end section of the bracket 11a on the vehicle side by bending the portion of the metal plate of the bracket 11a on the vehicle side that extends toward the rear beyond the edge on the rear end of the top plate section 23 of the bracket 12b on the column side downward and toward the front such as to have U shaped cross section. This bent back section 27 lightly wraps around and holds the rear end section of the top plate section 23 of the bracket 12b on the column side such that it faces both the top and bottom surfaces of the rear end section of the top plate section 23. However, it is possible to omit this bent back section 27 and to form a bent edge section 26 that is continuous around the entire perimeter edge section of the base plate section 25 except the edge on the front end.

The width dimension of the bracket 11a on the vehicle side is narrow in the front half section and wide in the rear half section. A locking notch 28 is formed as a locking cutout section in the center section in the width direction of the bracket 11a on the vehicle side such that it is open only in the center section of the edge on the front end of the bracket 11a on the vehicle side. The length dimension in the forward/backward direction of this locking notch 28 is long enough that after a secondary collision has advanced, or in other words, even when the steering wheel 1 is in a state where it can no longer displace in the forward direction due to impact energy during a secondary collision, the supporting force for supporting the bracket 12b on the column side by the bracket 11a is not lost. In this example, the shape of the rear end section (back end section) of the locking notch 28 is a semicircular shape as seen from the top. Instead of this locking notch 28, the locking hole could be a though hole that is not open on the edge of the front end of the base plate section of the bracket on the vehicle side, where the length in the forward/backward direction of this through hole is sufficiently maintained. It is also possible to form a plurality of locking cutout sections (locking notches or through holes) in a plurality of locations that are separated in the width direction.

Moreover, a pair of left and right installation holes 29 are formed in the middle section in the forward/backward direction of the bracket 11a on the vehicle side in the position on both the left and right sides in the portion near the rear end (back end) of the locking notch 28. The bracket 11a on the vehicle side is fastened to the vehicle body at two locations on both sides in the width direction by studs or bolts that are inserted through these installation holes 29. In this state, the bracket 11a on the vehicle side is prevented from displacing in the forward direction even during a secondary collision.

For both the bracket on the column side and the bracket on the vehicle side, as long as the bracket on the column side is supported so as to be able to break away in the forward direction with respect to the bracket on the vehicle side due to an impact load that is applied during a secondary collision, and as long as the construction of the support section of the present invention that will be explained below can be applied, it is possible to arbitrarily employ other known construction.

In order to support the bracket 12b on the column side by the bracket 11a on the vehicle side so as to be able to break away in the forward direction due to an impact load that is applied during a secondary collision, in this example, a plate shaped connecting bracket 30 is connected to and fastened to the portion of the surface of the top plate section of the bracket 12b on the column side that is exposed on the inside of the locking notch 28.

This connecting bracket 30 comprises an installation plate section 31, a raised section 32, and a restraining plate section 33. Of these, the installation plate section 31 is an elliptical or oval shape that is long in the forward/backward direction. The raised section 32 is bent at a right angle from the edge section around the perimeter of the installation plate section 31 such that it is raised in the upward direction. Therefore, in this example, the shape of the raised section 32 is a short cylindrical shape having an elliptical or oval planar shape (cross-sectional shape). Of the dimensions of the outer circumferential surface of the raised section 32, the dimension in the left/right direction is a little less than the width dimension of the locking notch 28. However, the length dimension in the forward/backward direction is sufficiently greater than the width dimension of the locking notch 28. Therefore, the shape of the rear half section of the raised section nearly matches the shape of the rear end section of the locking notch 28, and the connecting bracket 30 can move inside the locking notch 28 in the forward/backward direction, however, is prevented from rotating when positioned inside the locking notch 28. When the shape of the rear end section of the locking notch 28 is rectangular or V shaped as seen from the top, the shape of the installation plate section 31 and raised section 32 can be a rectangular or rhombic shape.

Figure 6:
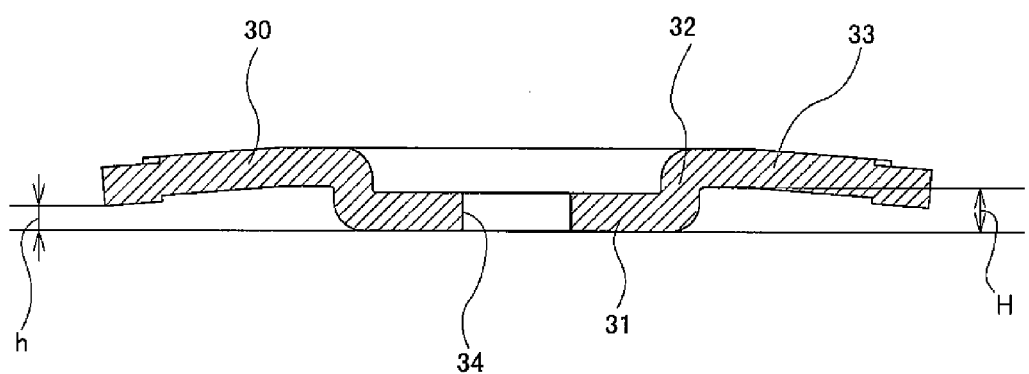
FIG. 6 is a cross-sectional view of a connecting bracket that has been removed from the apparatus of this first example, and illustrates the state before assembly as seen from the same direction as in FIG. 5.
Figure 7:
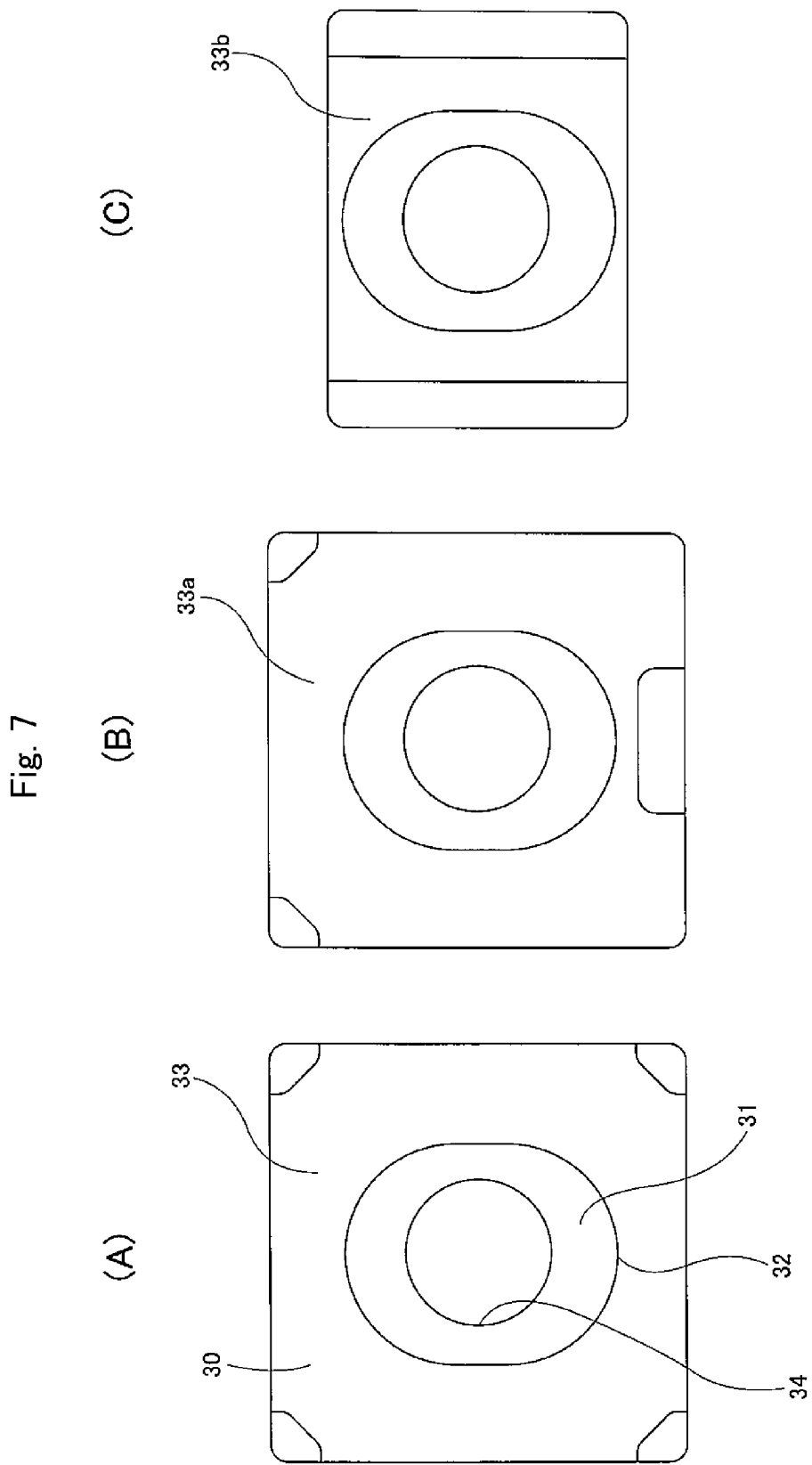
FIGS. 7A to 7C are bottom views of three examples of the position where the restraining plate section of the connecting bracket holds to the top surface of the bracket on the vehicle side, and illustrates this connecting bracket as seen from below.

Furthermore, the restraining plate section 33 is bent and extends toward the outside from the end on the top end of the raised section 32. More specifically, in this example, the restraining plate section 33 is bent toward the outside in the radial direction of the raised section 32 on the opposite side from the installation plate section 31. Moreover, in this example, the planar shape of the restraining plate section 33 is nearly square, however, the shape is not limited to this. The four corners of the restraining plate section 33 are offset in the downward direction by a pressing process, and the bottom surface of these four corner sections of the restraining plate section 33 come in contact with the top surface of the bracket 11a on the vehicle side. Furthermore, the portions that correspond to the four corner sections of the restraining plate section 33 (FIG. 2) are bent downward a little as illustrated in FIG. 6, so that when the connecting bracket 30 is in the free state, the distance H between the bottom surface of the installation plate section 31 to the bottom surface of the base end section of the restraining plate 33 is greater than the thickness T of the base plate section of the bracket 11a on the vehicle side (FIG. 5), and the distance h from the bottom surface of the installation plate section 31 to the bottom surface of the four corner sections is less than this thickness T (H>T>h). Moreover, an installation hole 34 is formed in the center section of the installation plate section 31.

The connecting bracket 30 is preferably made using a metal plate material such as stainless spring steel plate, galvanized steel plate, phosphor copper bronze plate or the like such that the desired elasticity is obtained, and due to the relationship with the bracket 11a on the vehicle side with which it comes in contact with, or in the case when a sliding plate is held between the connecting bracket 30 and the bracket 11a on the vehicle side, due to the relationship with that sliding plate, preferably a rust-proof metal plate is used. In this embodiment, the connecting bracket 30 is formed by plastic working that presses the center section of metal plate having an outer diameter that nearly coincides with the outer diameter of the restraining plate section in the planar direction. In other words, by firmly holding this metal plate between a pair of metal dies in a pressing process, the raised section 32 is formed at the same time that the portion that will be the installation plate section 31 is offset in the planar direction with respect to the portion that will be the restraining plate section 33. Moreover, at the same time or after the offset processing is performed, the installation hole 34 is formed in the center section of the installation plate section 31 by punching.

The top plate section 23 of the bracket 12b on the column side is supported by the bracket 11a on the vehicle side by way of the connecting bracket 30 so as to be able to break away in the forward direction due to impact energy that is applied during a secondary collision. Therefore, as illustrated in FIG. 1 to FIG. 5, when the restraining plate 33 covering the part of the bracket 11a on the vehicle side in the portion surrounding the rear end section (back end section) of the locking notch 28, the installation plate section 31 and raised section 32 fit inside the rear end section of the locking notch 28. With the installation hole 34 that is formed in the center section of the installation plate section 31 aligned with the through hole 35 that is formed in the top plate section 23, a bolt 36 is inserted through the installation hole 34 and the through hole 35, and the bolt 36 and a nut 37 are screwed together and tightened. By tightening, the bottom surface of the installation plate section 31 comes in close contact with the top plate section 23, and the installation plate section 31 is connected and fastened to the exposed portion on the top surface of the top plate section 23 on the inside of the locking notch 28.

In this state, the restraining plate 33 elastically deforms upward with respect to the installation plate section 31. As a result, the bottom surface of the four corner sections, whose difference h with the bottom surface of the installation plate section 31 that was a minimum in the free state, elastically comes in contact with the top surface of the base plate section 25 of the bracket 11a on the vehicle side. In this state, the portion of the bracket 11a on the vehicle side that surrounds the rear half section or rear end section of the of the locking notch 28 is held between the restraining plate section 33 and the top plate section 23, and the bracket 12b on the column side is supported by the bracket 11a on the vehicle side so as to be able to break away in the forward direction due to impact energy during a secondary collision.

When the bracket 12b on the column side is connected to the bracket 11a on the vehicle side so as to be able to break away in the forward direction during a secondary collision in this way, there is a sliding layer made of a low-friction material on the surfaces that rub against each other when breaking away. In other words, when breaking away due to a secondary collision, both the top and bottom surfaces of the portion of the bracket 11a on the vehicle side that surrounds the rear half section or rear end section of the locking notch 28 rubs against the bottom surface of the restraining plate section 33 and the top surface of the top plate section 23. Therefore, on one or both of these rubbing surfaces, a coating layer made of a low-friction material such as polytetrafluoroethylene resin, polyamide resin, molybdenum disulfide and the like is formed. Alternatively, a sliding plate that has a coating layer made of low-friction material is held between these rubbing surfaces.

With the construction of this example, it is possible to simplify tuning for stabilizing forward displacement of the steering wheel during a secondary collision, and lower and stabilize the break away load. The value of this break away load can be arbitrarily adjusted by appropriately selecting the material (hardness), dimensions (thickness, width) and shape of the metal plate of the connecting bracket, and adjusting the size of the restraining force that the bottom surface of the restraining plate section 33 applies to the top surface of the bracket 11a on the vehicle side, and the amount of contact surface area. Regardless of the size of this force (value of the break away load), the bolt 36 and nut 37 are tightened with a sufficiently large torque. Therefore, even though the break away load is kept low, it is possible to maintain sufficient support strength of the connecting bracket 30 with respect to the bracket 12b on the column side, and the connecting bracket 30 is prevented from breaking away needlessly. Preferably, after the bolt 36 and nut 37 have been tightened, the tip end section of the male screw section is crushed or the like to prevent loosening. Moreover, as necessary, as illustrated by the dot-dashed line in FIG. 2, the connecting bracket 30 is placed at the portion closer to the opening (closer to the front) than the rear end section of the locking notch 28 in its assembled position, and then pushed to the back end section as illustrated by the solid line, and by measuring the force (load) required when doing that, it is possible to determine whether or not the break away load is within a proper range.

Furthermore, construction is achieved that can prevent the steering wheel 1 from dropping excessively after a secondary collision. In order for this, in this example, the length in the forward/backward direction of the locking notch 28 is long enough so that after a secondary collision has advanced, or in other words, when the steering column 6c cannot displace further in the forward direction due to impact energy that was applied to the steering wheel 1 from the body of the driver during a secondary collision, the restraining plate section 33 of the connecting bracket 30 does not come completely out in the forward direction from the locking notch 28. With this kind of construction, even when the connecting bracket 30 has completely displaced in the forward direction together with the steering column 6c and the bracket 12b on the column side, at least the rear end section of both of the end sections in the width direction of the restraining plate section 33 of the connecting bracket 30 is located on the top side of the front end section of the bracket 11a on the vehicle side, preventing the connecting bracket 30 from dropping.

In the case of the example illustrated in the figures, when an impact load is applied in the rear direction to the bracket 12b on the column side due to a primary collision, the bracket 12b on the column side is prevented from displacing toward the rear by the engagement between the connecting bracket 30 and the edge on the rear end of the locking notch 28, and by the engagement between the bent back section 27 and the edge on the rear end of the top plate section 23. Therefore, even though the bolt 36 used does not have a large diameter and is not particularly strong, it is possible to sufficiently prevent the steering wheel 1, which is supported by the bracket 12b on the column side by way of the steering column 6c and steering shaft 5b, from displacing toward the rear during a primary collision and hitting the body of the driver.

In the case of the example in the figures, in order to sufficiently absorb the impact that is applied to the body of the driver that hits the steering wheel 1 during a secondary collision, an energy absorbing member (not illustrated in the figures) that plastically deforms and allows the bracket 12b on the column side to displace in the forward direction is provided between bracket 12b on the column side or the steering column 6c and the bracket 11a on the vehicle side or a portion of the vehicle body that does not displace in the forward direction during a secondary collision. During a secondary collision, the top plate section 23 of the bracket 12b on the column side and the connecting bracket 30 begin to displace in the forward direction with respect to the bracket 11a on the vehicle side due to the break away load. This displacement causes the energy absorbing member to plastically deform and absorb impact energy that is applied to the bracket 12b on the column side from the body of the driver. The construction of various kinds of energy absorbing members is known, and this energy absorbing member is not a feature of the present invention, so drawings and a detailed explanation are omitted.

The explanation above explained the case in which, as illustrated in FIG. 7A, the four corner sections of the bottom surface of the restraining plate section 33 come in contact with the top surface of the bracket 11a on the vehicle side. However, when embodying the present invention, at least two locations on the left and right end sections of the bottom surface of the restraining plate 33 should come in contact with the top surface of the bracket 11a on the vehicle side. For example, as illustrated in FIG. 7B, it is possible for two locations on both the left and right sides of front end of the restraining plate section 33a, and the one location in center section of the rear end, for a total of three locations, to come in contact with the top surface of the bracket 11a on the vehicle side. Furthermore, as illustrated in FIG. 7C, it is possible for two locations in the forward/backward direction along both the left and right end sections of the restraining plate section 33b to come in contact with the top surface of the bracket 11a on the vehicle side.

EXAMPLE 2

Figure 8:
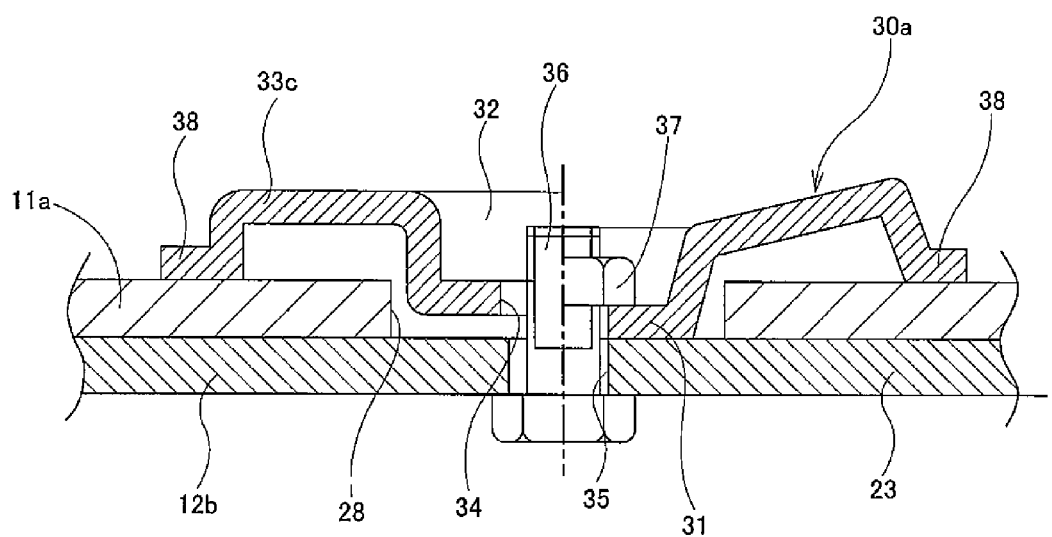
FIG. 8 is a cross-sectional view similar to FIG. 5 of a second example of an embodiment of the present invention, and illustrates the left half section in the state before the bolt and nut are tightened, and illustrates the right half section after the bolt and nut are tightened.

FIG. 8 illustrates a second example of an embodiment of the present invention. In this example, the portion of the restraining plate section 33c of the connecting bracket 30a that is supposed to hold the top surface of the bracket 11a on the vehicle side (FIG. 7) is bent downward a large amount, and the tip end section is further bent outward to form a plurality of contact sections 38. By screwing together and tightening the bolt 36 and nut 37, the restraining plate section 33c is elastically deformed from the state illustrated in the left half of FIG. 8 to the state illustrated in the right half such that the contact surface area between that the bottom surfaces of the contact sections 38 and the top surface of the bracket 11a on the vehicle side is stably maintained. In the case of the construction of this example, the contact surface area is stabilized, so it becomes easier to further stabilize the break away load during a secondary collision. With the bolt 36 and nut 37 tightened, by the bottom surfaces of the contact sections 38 elastically contacting the top surface of the bracket 11a on the vehicle side, it is possible to deform the metal plate of the connecting bracket 30a past the yielding point to plastic deformation region. However, in order to stabilize the break away load, preferably the connecting plate is assembled in the elastic range, in other words, in a range where deformation does not go past the yielding point. The construction and function of the other parts are the same as in the first example, so drawings and explanations of identical parts are omitted.

EXAMPLES 3 TO 5

Figure 9:
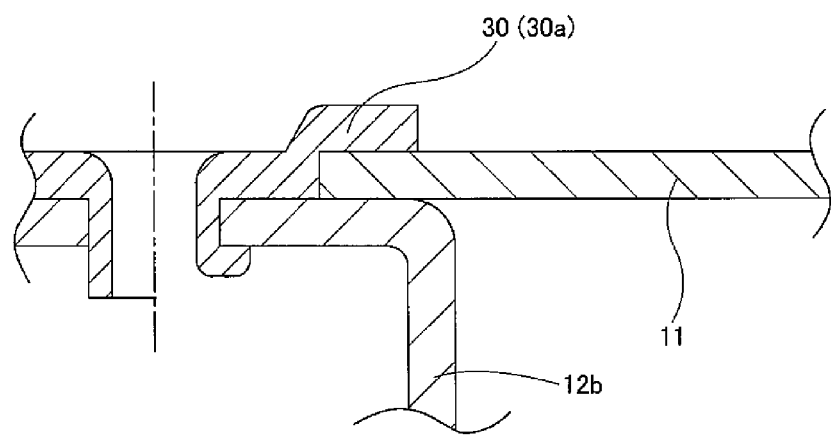
FIG. 9 is a cross-sectional view similar to FIG. 5 of a third example of an embodiment of the present invention, and illustrates the left half section in the state before the cylindrical section that is formed during the burring process is crimped, and illustrates the right side in the state after crimping.
Figure 10:
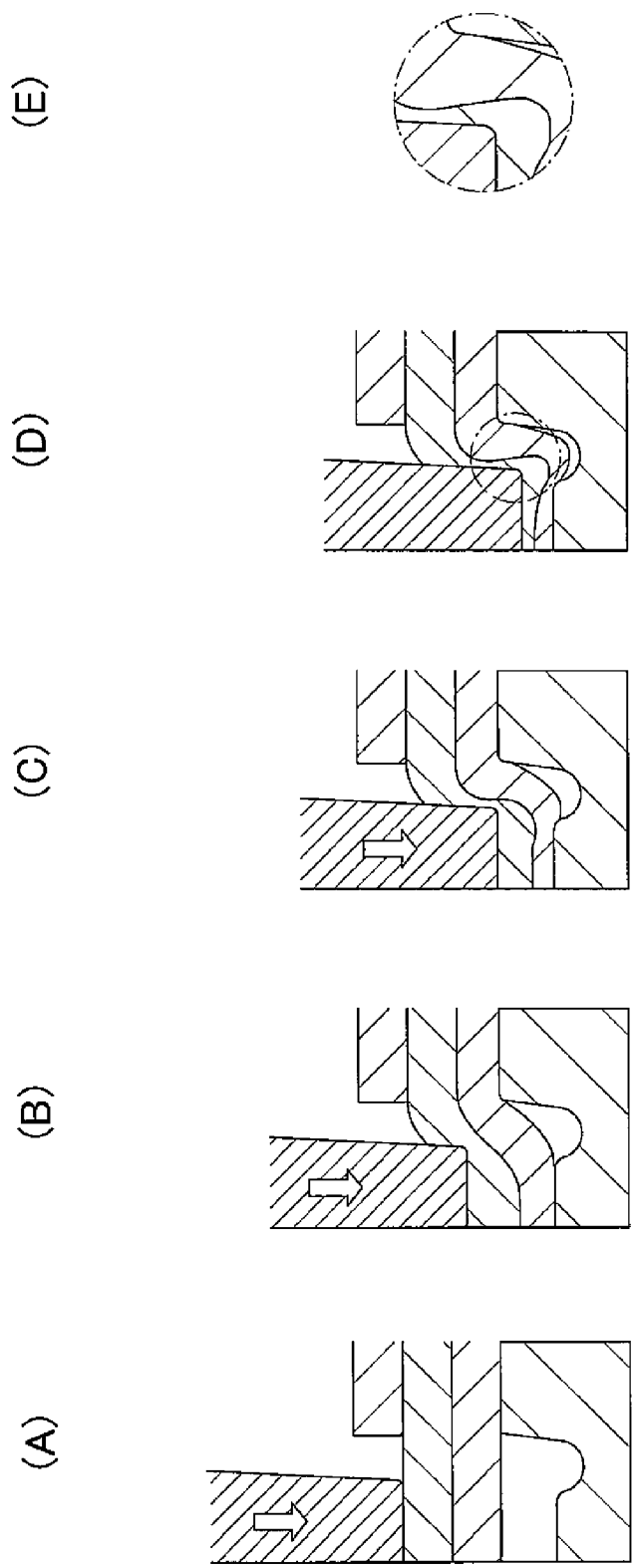
FIGS. 10A to 10E illustrate a fourth example of an embodiment of the present invention, where
Figure 11:
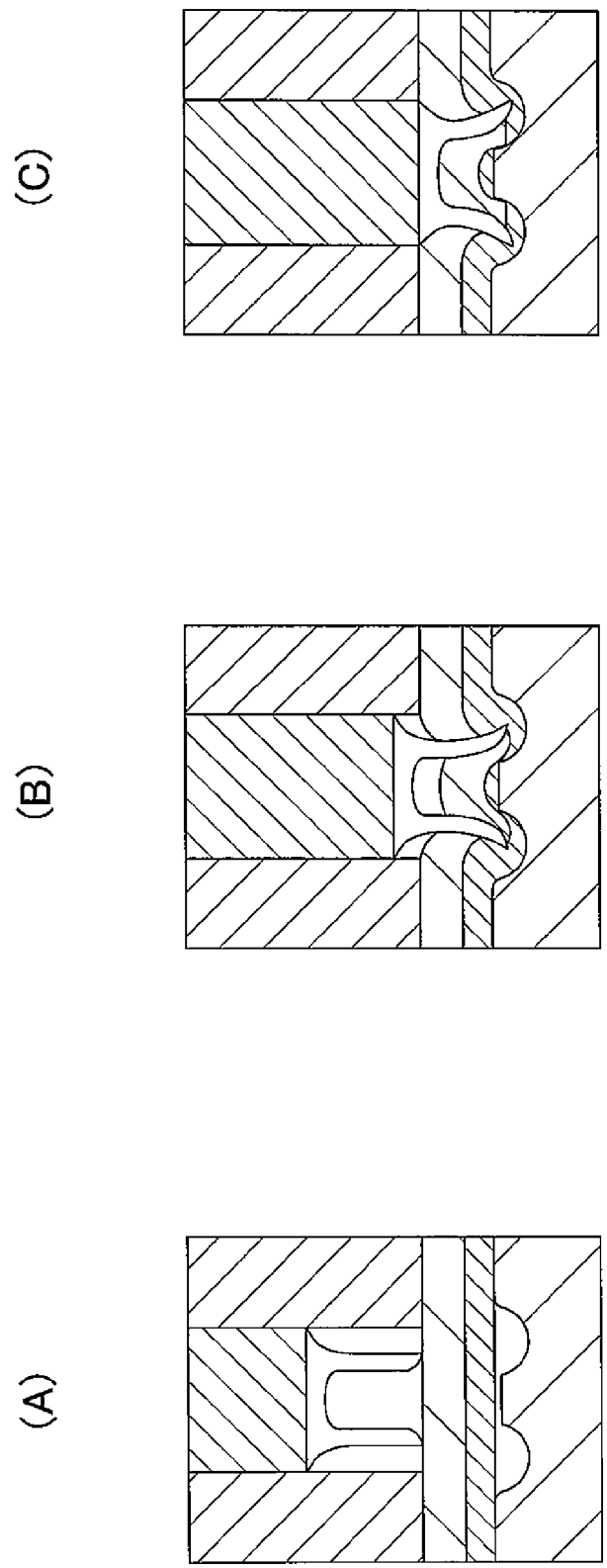
FIGS. 11A to 11C are of a fifth example of an embodiment of the present invention, and are cross-sectional views illustrating in order the process of crimping a self-piercing rivet.
Figure 12:
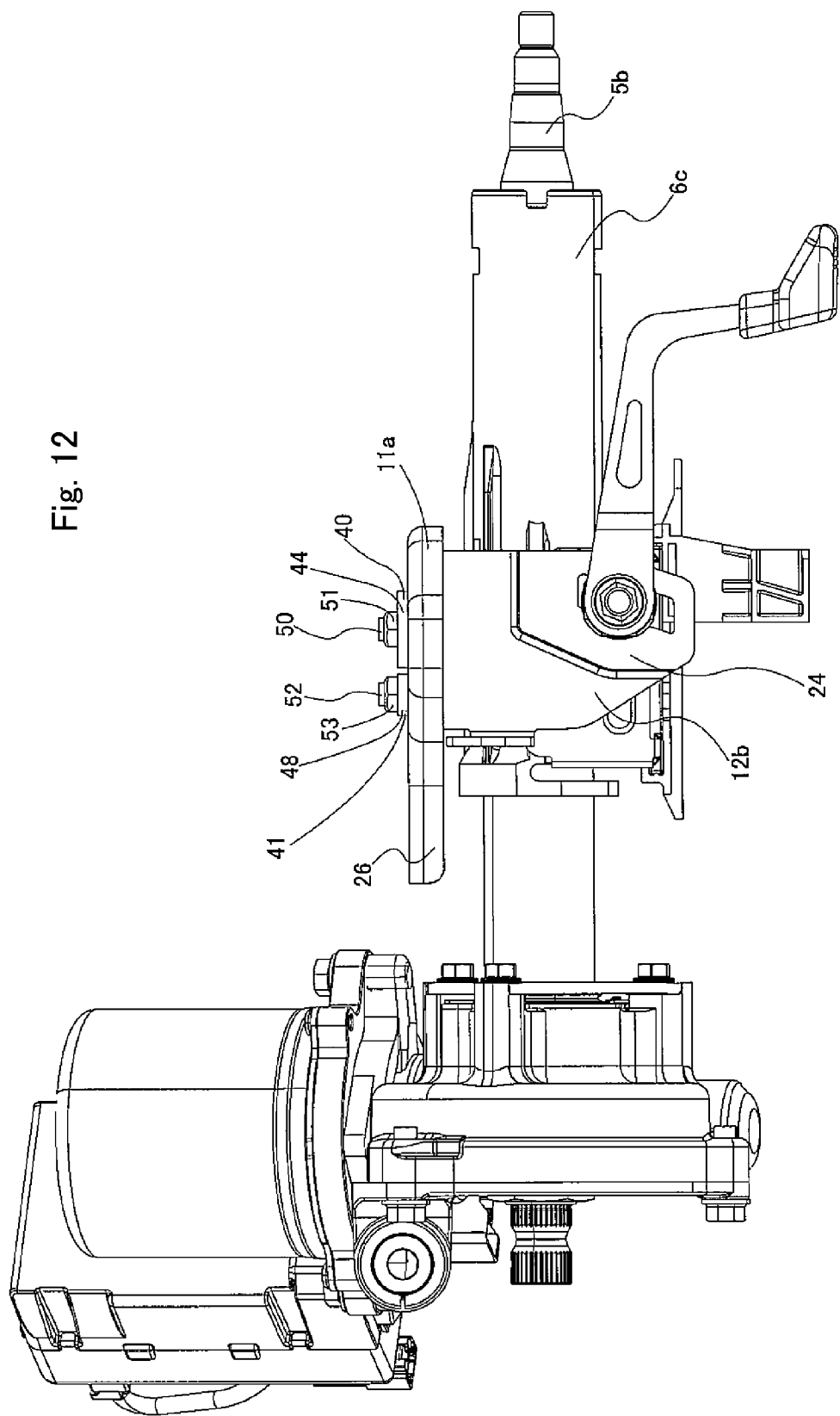
FIG. 12 is a side view illustrating a sixth example of an embodiment of the present invention.
Figure 13:
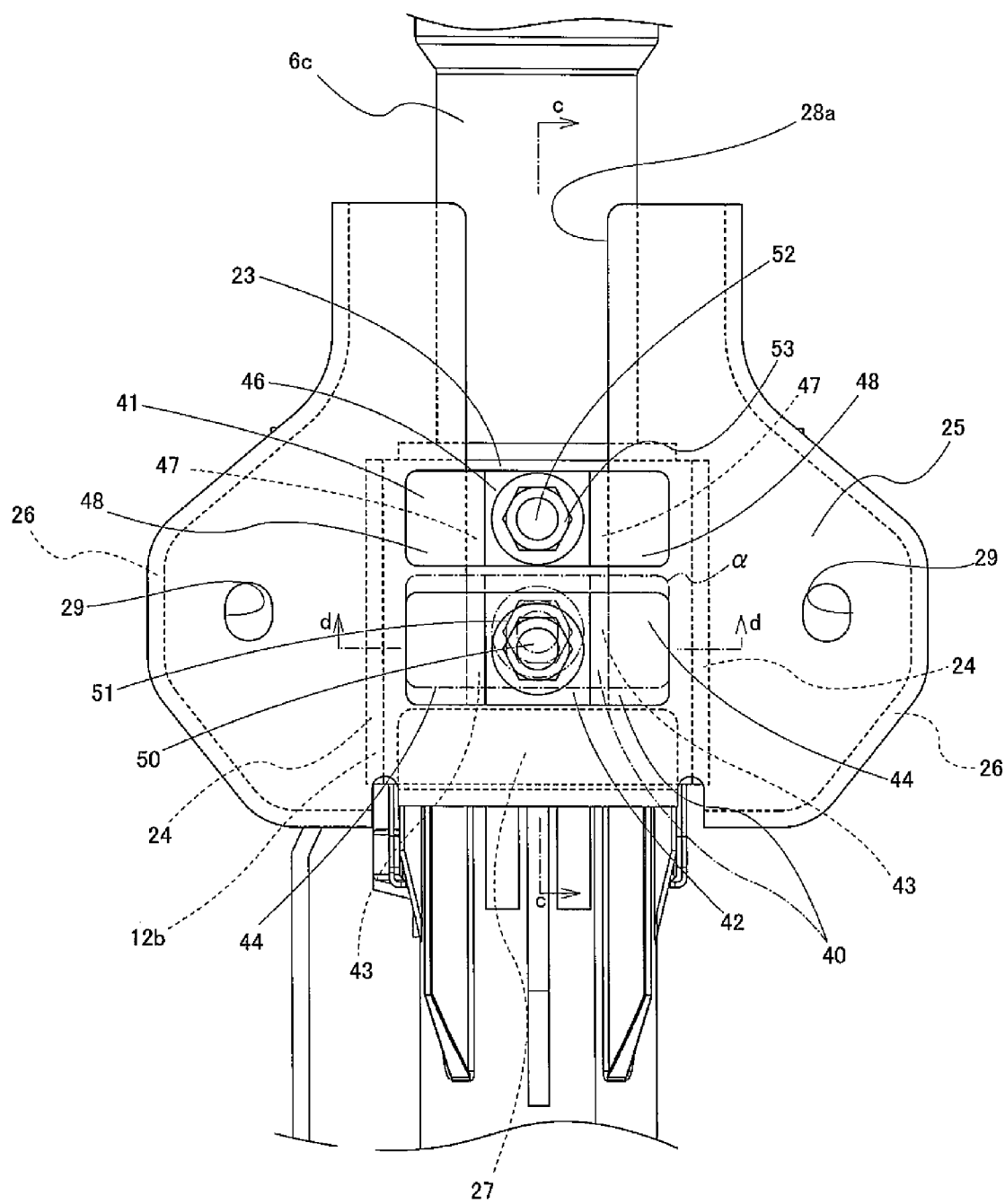
FIG. 13 is a top view of the major parts of the center section in FIG. 12, and illustrates the state as seen from above.
Figure 14:
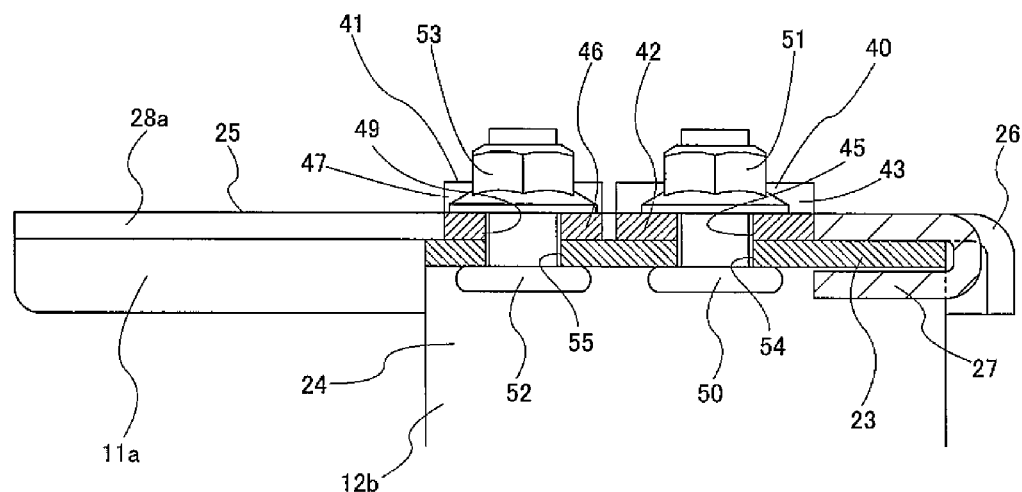
FIG. 14 is a cross-sectional view of section c-c in FIG. 13.
Figure 15:
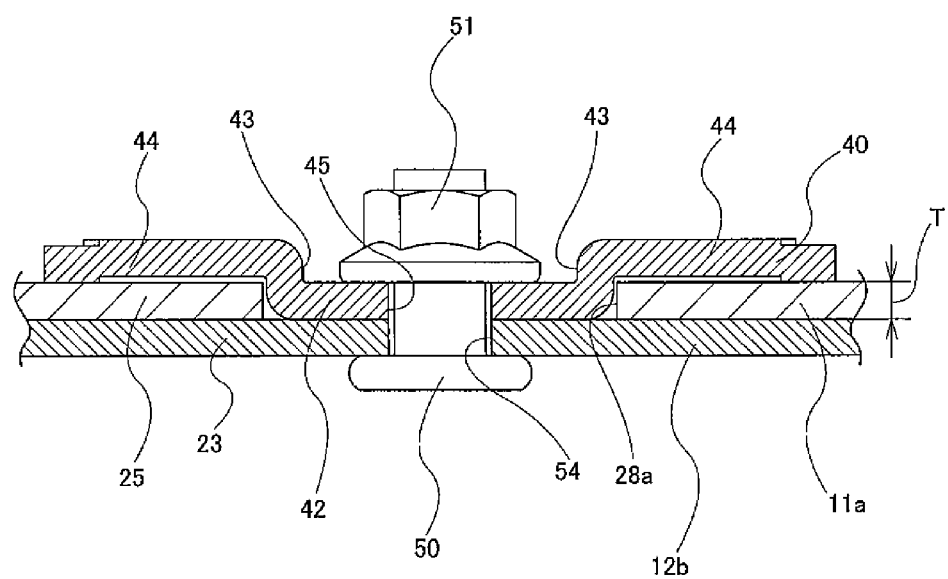
FIG. 15 is a cross-sectional view of section d-d in FIG. 13.
Figure 16:
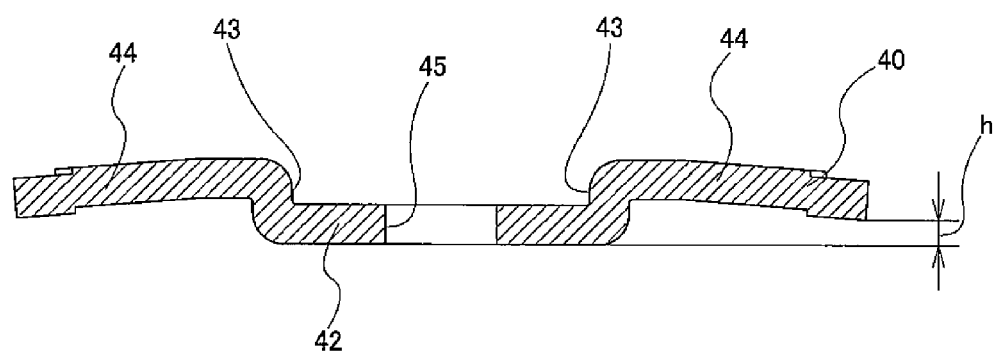
FIG. 16 is a cross-sectional view of a connecting bracket that has been removed from the apparatus of the sixth example, and illustrates the state before assembly as seen from the same direction as in FIG. 15.
Figure 17:
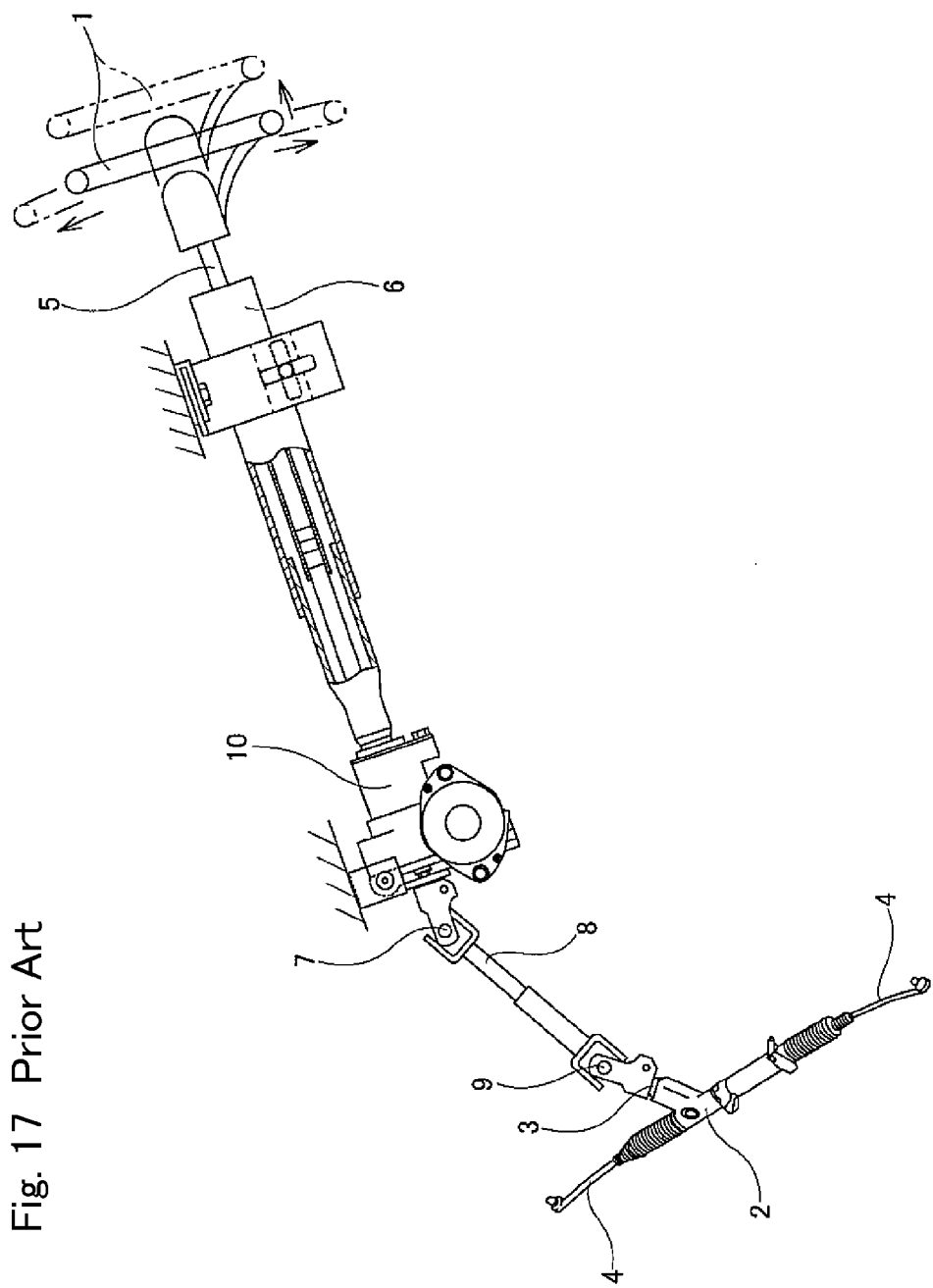
FIG. 17 is a partial cross-sectional view of an example of a conventionally known steering apparatus.
Figure 18:
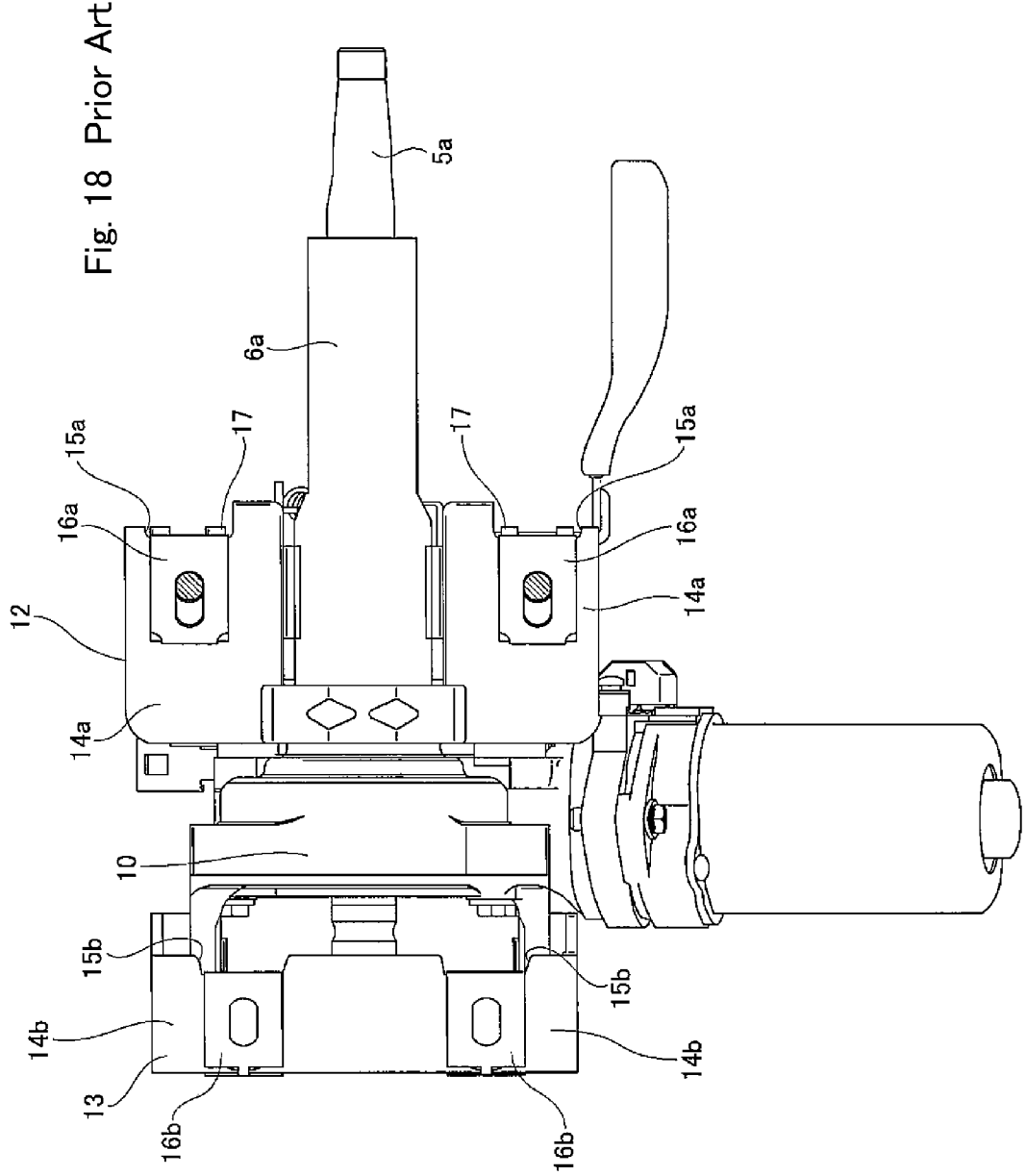
FIG. 18 is a top view of an example of a conventional steering column support apparatus, and illustrates the normal state.
Figure 19:
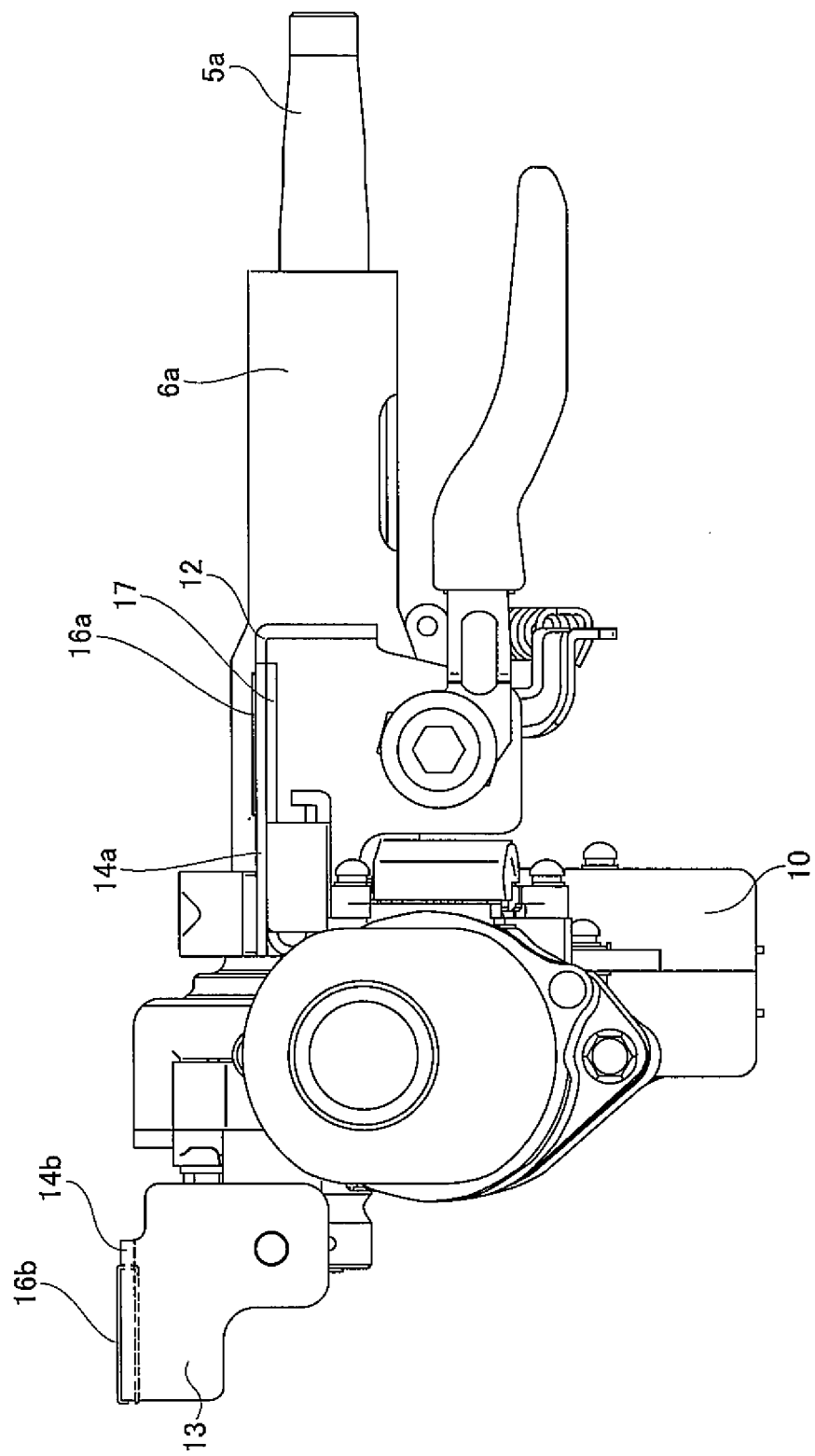
FIG. 19 is a side view of the apparatus in FIG. 18.
Figure 20:
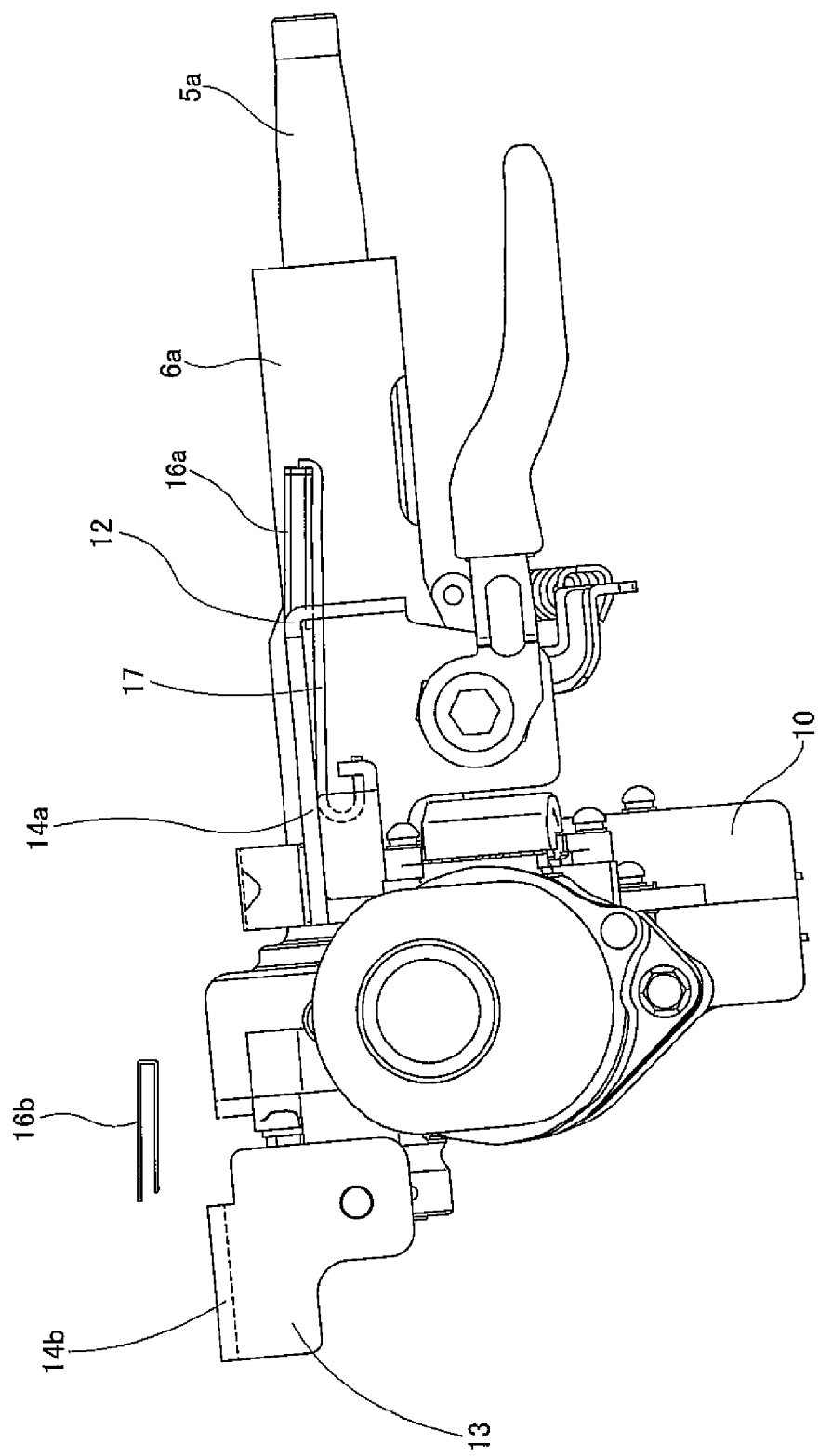
FIG. 20 is a side view of the apparatus in FIG. 18, and illustrates the state wherein the steering column has displaced in the forward direction during a secondary collision.
Figure 21:
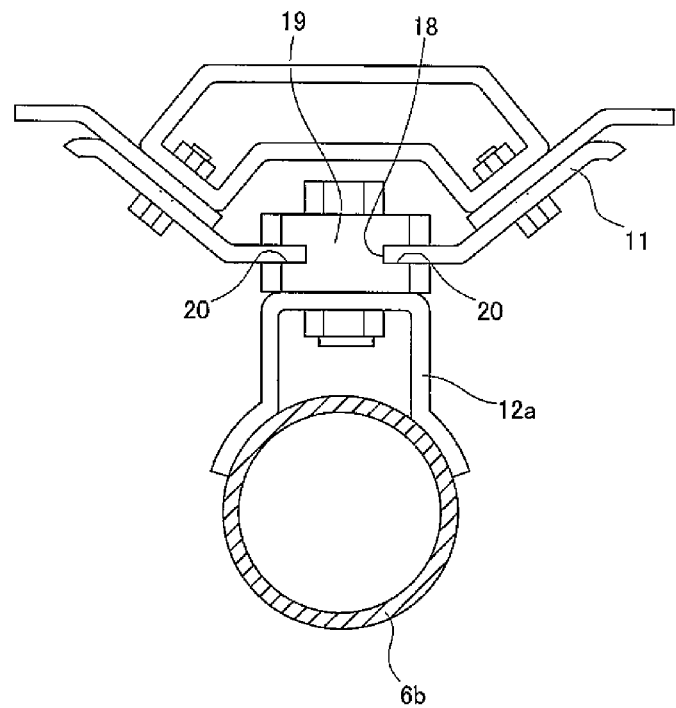
FIG. 21 illustrates an example of convention construction, and is a cross-sectional view of a virtual plane that is in a direction orthogonal to the center axis of the steering column.
Figure 22:
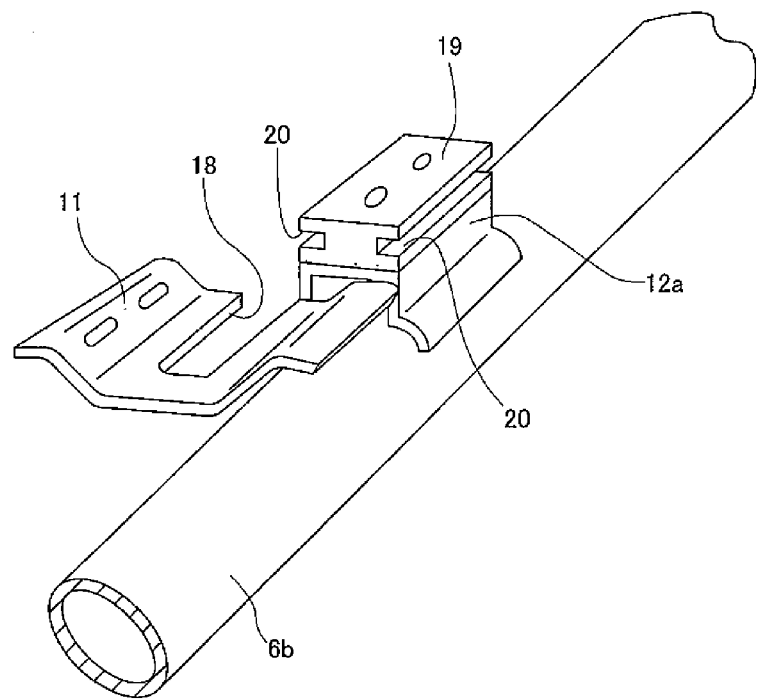
FIG. 22 is a perspective view of the construction in FIG. 21, and illustrates the state before the bracket on the vehicle side and the bracket on the column side are connected.
Figure 23:
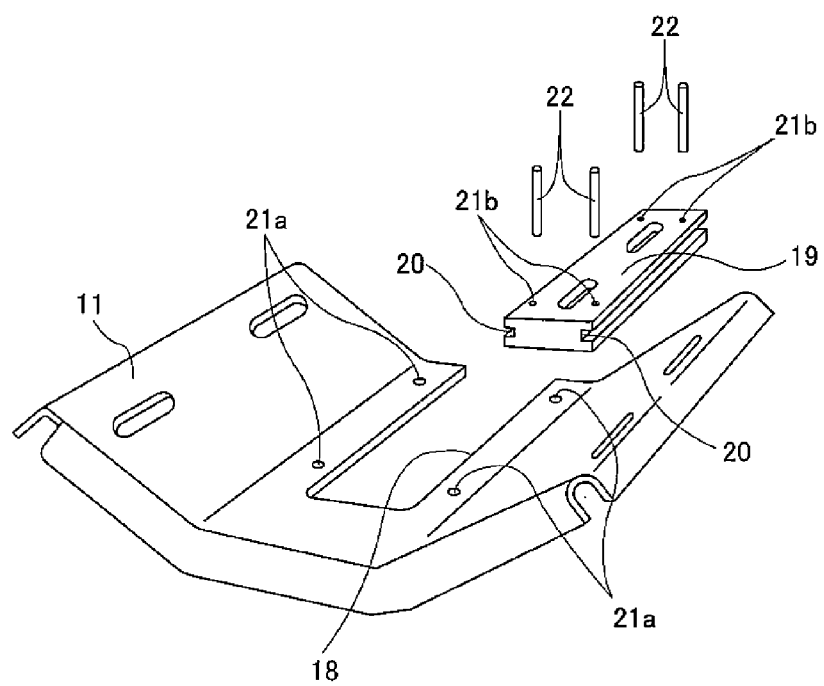
FIG. 23 is a perspective view of the construction in FIG. 21 with the steering column omitted, and illustrates the connecting pins.

Third through fifth examples of an embodiment of the present invention will be explained with reference to FIG. 9 to FIG. 11. In both the first and second examples, the top plate section 23 of the bracket 12b on the column side and the connecting bracket 30, 30a were connected and fastened together by a bolt 36 and nut 37, however in a third example, they are connected and fastened together by burring and crimping (FIG. 9), in a fourth example, they are connected and fastened together by clinching (FIG. 10), and in a fifth example, they are connected and fastened together by a self-piercing rivet (FIG. 11). The construction for these kinds of connections is widely known, so only drawings are provided and detailed explanations are omitted.

It is omitted in the figures, however, the top plate section of the bracket on the column side and the connecting bracket can be connected and fastened together by welding such as spot welding or fillet welding. In short, when embodying the present invention, the method for connecting and fastening together the top plate section of the bracket on the column side and the connecting bracket is not particularly limited.

SIXTH EXAMPLE

FIG. 12 to FIG. 16 illustrate a sixth example of an embodiment of the present invention. In this example, the connecting bracket comprises two members, a plate shaped main connecting bracket 40 and a plate shaped sub connecting bracket 41, and this main connecting bracket 40 and sub connecting bracket 41 are connected and fastened to the exposed portion of the top surface of the top plate section 23 of the bracket 12b on the column side that is exposed on the inside the locking notch 28a. In this example, the shape of the rear end section (back end section) of the locking notch 28a is rectangular.

The main connecting bracket 40 is formed by bending a rectangular metal plate such as stainless steel plate or the like that has elasticity and is rust proof, and comprises a main installation plate section 42, a pair of left and right main raised sections 43 and a pair of left and right main restraining plate sections 44.

The main installation plate section 42 has a width dimension in the left/right direction that is a little less than the width direction in the same direction of the locking notch 28a, and a main installation hole 45 is formed in the center section. The left and right main raised sections 43 rise upward at right angles from the edges on both the left and right ends of the main installation plate section 42. The space between the outside surfaces (side surfaces of opposing sides) of the main raised sections 43 is a little less than the width dimension of the locking notch 28a. Therefore, the main raised sections 43 can fit into the rear end section of the locking notch 28, and the main connecting bracket 40 can move in the forward/backward direction of the locking notch 28a, however is prevented from rotating when located inside the locking notch 28a. Furthermore, the left and right main restraining plate sections 44 are bent toward the outside from the edges of the top ends of the left and right main raised sections 43. In other words, in this example, the main restraining plate sections 44 are bent toward opposite directions from each other. In the free state, the main restraining plate sections 44 are shaped so as to be inclined downward going toward the edges on the tip ends (edges on both the left and right ends). Moreover, the edge sections on the tip ends of the main restraining plate sections 44 are offset downwards. Therefore, the bottom surfaces of the tip end sections of these main restraining plate sections 44 protrude downward compared with the bottom surfaces from the middle sections to the base end sections. In the free state, the distance h between the bottom surface of the tip end section and the bottom surface of the main installation plate section 42 is less than the thickness T of the base plate section of the bracket 11a on the vehicle side (h<T).

On the other hand, the sub connecting bracket 41 is smaller than the main connecting bracket 40, however has a similar shape. In other words, like the main connecting bracket 40, this sub connecting bracket 41 is formed by bending rectangular metal plate such as stainless steel plate that has elasticity and that is rust proof, and comprises a sub installation plate section 46, a pair of left and right sub raised sections 47 and a pair of left and right sub restraining plate sections 48. A sub installation hole 49 is formed in the center section of the sub installation plate section 46. In this example, the length dimension in the forward/backward direction of the sub connecting bracket 41 is shorter than the length dimension in the same direction of the main connecting bracket 40. In this example, there is no difference in the construction of the other parts of the main connecting bracket 40 and the sub connecting bracket 41.

The main connecting bracket 40 and the sub connecting bracket 41 are respectively connected and fastened to the top surface of the top plate section 23 of the bracket 12b on the column side by a main bolt 50 and main nut 51, and a sub bolt 52 and sub nut 53. The portions of the base plate section 25 of the bracket 11a on the vehicle side on both the left and right sides of the locking notch 28a are held between the top surface of the top plate section 23 and the bottom surfaces of the main restraining plate section 44 and the sub restraining plate section 48.

In other words, in the case of the main connecting bracket 40, the main bolt 50 is inserted from the bottom through the main through hole 54, which is formed in the center section of the top plate section 23, and the main installation hole 45, and the main nut 51 is screwed onto the portion of the top end section of the main bolt 50 that protrudes from the top surface of the main installation plate section 42, and tightened. Tightening the nut 51 causes the top surface of the top plate section 23 and the bottom surface of the main installation plate section 42 to come in contact with no space in between, and causes the bottom surfaces of the tip end sections of the main restraining plate sections 44 to elastically come in contact with the top surface of the portions of the base plate section 25 on both the left and right sides of the locking notch 28a. Similarly, in the case of the sub connecting bracket 41, tightening the sub nut 53 onto the sub bolt that is inserted through the sub through hole 55, which is formed in the portion near the front of the center section in the width direction of the top plate section 23, and the sub installation hole 49 causes the top surface of the top plate section 23 and the bottom surface of the sub installation plate section 46 to come in contact with no space in between, and the bottom surfaces of the tip end sections of the sub restraining plate section 48 to elastically come in contact with the top surface of the portions of the base plate section 25 on both the left and right sides of the locking notch 28a.

In the case of the construction of this example, the portion of the base plate section of the bracket 11a on the vehicle side that are on both the left and right sides of the locking notch 28a are elastically held between the top surface of the top plate section 23 of the bracket 12b on the column side and the bottom surfaces of the main restraining plate section 44 and the sub restraining plate section 48 due to the elasticity of these restraining plate sections 44, 48. Therefore, the bracket 12b on the column side is supported by the bracket 11a on the vehicle side so as to be able to break away in the forward direction due to an impact load that is applied during a secondary collision. In this example as well, as in the first example, it is possible to form a coating layer made of a low-friction material between the top and bottom surfaces of the bracket 11a on the vehicle side and the opposing surfaces. Alternatively it is possible to hold a sliding plate that has a coating layer made of a low-friction material between these rubbing surfaces.

When assembling the construction of this example, first, the main installation plate section 42 of the main connecting bracket 40 is connected and fastened to the top plate section 23 of the bracket 12b on the column side by the main bolt 50 and main nut 51. Then parts of the base plate section of the bracket 11a on the vehicle side are held between the top surface of the top plate section 23 and the bottom surfaces of the main restraining plate sections 34 such that the top plate section 23 of the bracket 12b on the column side is supported by the bracket 11a on the vehicle side. The sub connecting bracket 31 is not yet assembled. In this state, the shape and rigidity (elasticity) of the main connecting bracket 40 is adjusted such that load required for causing these brackets 11a, 12b to displace in the forward/backward direction is less than the proper break away load, which is the suitable load for the bracket 12b on the column side to start displacing in the forward/backward direction with respect to the bracket 11a on the vehicle side during a secondary collision.

With the bracket 11a on the vehicle side and the bracket 12b on the column side connected only by the main connecting bracket, the break away load in the intermediate stage, which is the load at which the bracket 12b on the column side begins to displace in the forward direction with respect to the bracket 11a on the vehicle side, is measured. In order to perform this measurement work, for example, the bracket 12b on the column side is installed a little further (a few mm) in the forward direction (state illustrated by the virtual line α in FIG. 13) with respect to the bracket 11a on the vehicle side than the completely assembled state illustrated in FIG. 13 and FIG. 14. Next, the bracket 12b on the column side is displaced the few mm portion in the backward direction with respect to the bracket 11a on the vehicle side to the completely assembled state. The load required for this few mm displacement is measured and taken to be the break away load in the intermediate stage. The direction of the few mm displacement is opposite the direction of displacement during a secondary collision, however, because there is symmetry in the direction of displacement and the size of the load required for displacement, so this a not particularly a problem.

After the break away load in the intermediate stage has been measured, next, the difference between the proper break away load (design value), which is the load suitable for the bracket 12b on the column side to start displacement in the forward/backward direction with respect to the bracket 11a on the vehicle side during a secondary collision, and the break away load in the intermediate stage is found. Next, by connecting the sub installation plate section 46 of the sub connecting bracket 41 to the top plate section 23, the connection strength related to the break away load between the bracket 11a on the vehicle side and the bracket 12b on the column side is increased an amount that corresponds to the difference in break away loads. Then, the break away load between the bracket 11a on the vehicle side and the bracket 12b on the column side, which are connected by the main connecting bracket 40 and sub connecting bracket 41, is taken to be the proper break away load.

The following methods (1) or (2) can be employed in order to properly adjust the increase in break away load due to adding the sub connecting bracket 41 as described above to the connection between the bracket 12b on the column side and the bracket 11a on the vehicle side.

(1) The connection strength between the top plate section 23 and the sub installation plate section 46 is adjusted. In other words, by adjusting the tightening torque between the sub bolt 52 and sub nut 53, the force (contact pressure at the area of contact) that the bottom surfaces of the sub restraining plate sections 48 of the sub connecting bracket 41 is pressed against the top surface of the bracket 11a on the vehicle side is adjusted. A space remains between the top surface of the top plate section 23 and the bottom surface of the sub installation plate section 46. After the sub bolt 52 and sub nut 53 have been tightened to a specified torque, loosening of the nut 53 can be prevented by crimping and deforming the tip end section of the shaft section of the sub bolt 52.

(2) A plurality of sub connecting brackets 41 having sub restraining plate sections 48 with different elasticity are prepared, and a sub connecting bracket 41 having sub restraining plate section 48 with elasticity that corresponds to the difference in break away loads is selected, and the sub installation plate section 46 of that sub connecting bracket 41 is connected and fastened to the top plate section 23 of the bracket 12b on the column side. As the plurality of kinds of sub connecting brackets 41 having sub restraining plate sections 48 with different elasticity, it is possible use brackets having different lengths in the forward/backward direction, for example, or it is possible to use brackets having different thickness dimensions, or it is possible to use brackets having different length and thickness dimensions.

Regardless of which method (1) and (2) above is used, by appropriately adjusting the force at which the bottom surfaces of the pair of left and right sub restraining plate sections 48 of the sub connecting bracket 41 are pressed against the top surface of the bracket 11a on the vehicle side, it is possible to compensate for the difference between the proper break away load and the break away load in the intermediate stage. As a result, with the bracket 12b on the column side connected with the bracket 11a on the vehicle side by the main connecting bracket 40 and sub connecting bracket 41, it is possible to keep the break away load of the bracket 12b on the column side with respect to the bracket 11a on the vehicle side within the design value (proper break away load) with good precision, or in other words, it is possible to keep the break away load at a value with fluctuation suppressed at a level that will be no practical problem.

The bracket on the vehicle side and the bracket on the column side can be connected even when one of either main connecting bracket or sub connecting bracket is a simply a flat shape, or in other words, is constructed using a flat member having left and right end sections that function as a middle section and a pair of left and right restraining plate sections. However, in this construction, it becomes easy for positioning of the bracket on the vehicle side and bracket on the column side in the width direction to become uncertain. Moreover, this is disadvantageous from the aspect of maintaining the connection strength (rigidity) between the main connecting bracket and the sub connecting bracket and the bracket on the column side. Therefore, preferably the construction for at least the main connecting bracket comprises an installation plate section that is connected and fastened to the exposed portion of the top surface of the top plate section that is inside the locking cutout section, a pair of raised sections that rise upward from the edges on both the left and right ends of the installation plate section, and a pair of left and right restraining sections that are bent and extend outward from the edges on the top ends of the raised sections. On the other hand, a simple flat shaped connecting bracket can be used as the sub connecting bracket. Furthermore, the main connecting bracket and the sub connecting bracket can be constructed as one long member in the forward/backward direction, and can be connected to the bracket on the column side at a plurality of locations in the front and back. In this case, a low-rigidity section is formed in the middle section in the forward/backward direction. Then either the front or back is connected, and after the break away load of the intermediate stage is found, the other is connected with a specified strength.

The construction and function of the other parts are the same as in the first example, so drawings and explanations of identical parts are omitted. It is also possible to substitute or additionally employ the construction of the second example to fifth example for the sixth example.

[Industrial Applicability]

The present invention is not limited to being applied to a steering column support apparatus comprising both a tilt mechanism for adjusting the up/down position of the steering wheel 1, and a telescopic mechanism for similarly adjusting the forward/backward position, but can also be applied to a steering column support apparatus that comprises only a tilt mechanism or only a telescopic mechanism, and furthermore, can also be applied to a fixed steering wheel type steering column support apparatus having neither of these mechanisms.

[Explanation of Reference Numbers]

1 Steering wheel
2 Steering gear unit
3 Input shaft
4 Tie rod
5, 5a, 5b Steering shaft
6, 6a, 6b, 6c Steering column
7 Universal joint
8 Intermediate shaft
9 Universal joint
10 Housing
11, 11a Bracket on the vehicle side
12, 12a, 12b Bracket on the column side
13 Bracket on the housing side
14a, 14b Installation plate section
15a, 15b Notch
16a, 16b Sliding plate
17 Energy absorbing member
18 Locking notch
19 Locking capsule
20 Locking groove
21a, 21b Locking hole
22 Locking pins
23 Top plate section
24 Support plate sections
25 Base plate section
26 Bent edge section
27 Bent back section
28, 28a Locking notch
29 Installation holes
30, 30a Connecting bracket
31 Installation plate section
32 Raised section
33, 33a, 33b, 33c Restraining plate section
34 Installation hole
35 Through hole
36 Bolt
37 Nut
38 Contact sections
40 Main connecting bracket
41 Sub connecting bracket
42 Main installation plate section
43 Main raised sections
44 Main restraining plate sections 45 Main installation hole
46 Sub installation plate section
47 Sub raised sections
48 Sub restraining plate sections
49 Sub installation hole
50 Main bolt
51 Main nut
52 Sub bolt
53 Sub nut
54 Main through hole
55 Sub through hole

What is claimed is:

1. A steering column support apparatus comprising:
a bracket on the vehicle side that is fastened to the vehicle in at least two locations on both sides in the width direction, does not displace in the forward direction during a secondary collision and has a locking cutout section that extends in the forward/backward direction formed in the portion between the two locations on both sides in the axial direction;
a bracket on the column side that is located below the bracket on the vehicle side, supports a steering column, and comprises a top plate section on the top end section having a dimension in the width direction that is larger than the width dimension of the locking cutout section; and
a connecting bracket that comprises an installation plate section that connects and fastens to a portion of the top surface of the top plate section which is exposed on the inside of the locking cutout section, a raised section that rises upward from the installation plate section, and a restraining plate section that is bent and extends to the outside from the edge on the top end of the raised section,
with the installation plate section connected and fastened to the top plate section, at least part of the restraining plate section elastically coming in contact with the top surface of the bracket on the vehicle side, and by holding part of the bracket on the vehicle side between the restraining plate section and the top plate section, the bracket on the column side being supported by the bracket on the vehicle side so as to be able to break away in the forward direction due to an impact load that is applied during a secondary collision.

2. The steering column support apparatus described in claim 1, wherein the connecting bracket is constructed from a resilient metal plate.

3. The steering column support apparatus described in claim 1, wherein a coating layer made of a low-friction material exists between both the top and bottom surfaces of the bracket on the vehicle side and the surfaces of the members that are in contact with these top and bottom surfaces before the occurrence of a secondary collision.

4. The steering column support apparatus described in claim 1, wherein the locking cutout section is constructed by a locking notch that is open on the edge of the front end of the bracket on the vehicle side, with the length in the forward/backward direction of this locking notch being longer than the length in the forward/backward direction of the bracket on the column side, so that even when the connecting bracket has displaced forward all the way together with the steering column and the bracket on the column side, at least part of the restraining plate section of the connecting bracket is located on the top side of the front end section of the bracket on the vehicle side, preventing the connecting bracket from dropping.

5. The steering column support apparatus described in claim 1, wherein the bracket on the vehicle side is made using a metal plate, and a bent back section is formed by bending a portion of this metal plate that extends toward the rear beyond the edge on the rear end of the top plate section of the bracket on the column side downward toward the front so as to have a U-shaped cross section, with this bent back section wrapping around and holding the rear end section of the top plate section.

6. The steering column support apparatus described in claim 1, wherein the connecting bracket comprises a main connecting bracket and a sub connecting bracket,
one of either the main connecting bracket or sub connecting bracket comprises an installation plate section that connects and fastens to the portion on the top surface of the top plate section that is exposed on the inside of the locking cutout section, a pair of raised sections that rise from the edges on both the left and right of the installation plate section, and a pair of left and right restraining plate sections that are bent and extend outward from the edges on the top ends of the raised sections,
the other connecting bracket comprises an installation plate section that connects and fastens to the portion on the top surface of the top plate section that is exposed on the inside of the locking cutout section, a pair of raised sections that rise from the edges on both the left and right of the installation plate section, and a pair of left and right restraining plate sections that are bent and extend outward from the edges on the top ends of the raised sections, or the other connecting bracket comprises a flat-shaped member having a middle section and left and right end sections that function as a pair of left and right restraining plate sections,
with the installation plate section of the one connecting bracket connected and fastened to the top plate section, and with the installation plate section of the other connecting bracket connected and fastened to the top plate section, or the middle section fastened to the top plate section, the restraining plate sections of these connecting brackets are brought into elastic contact with the top surface of the bracket on the vehicle side, and part of the bracket on the vehicle side is held between these restraining plate sections and the top plate section.

7. An assembling method of the steering column support apparatus described in claim 6, the method comprising the steps of:
(1) connecting and fastening the one connecting bracket to the top plate section of the bracket on the column side, supporting the bracket on the column side with the bracket on the vehicle side, and then measuring the break away load in the intermediate stage, which is the load causing the bracket on the column side to start displacing in the forward direction with respect to the bracket on the vehicle side,
(2) finding the difference between the proper break away load, which is the load suitable for causing the bracket on the column side to start displacing in the forward/backward direction during a secondary collision, and the break away load in the intermediate stage, and
(3) connecting the other connecting bracket to the top plate section with the one connecting bracket connected and fastened to the top plate section of the bracket on the column side, so as to increase the connection strength between the bracket on the column side and the bracket on the vehicle side by an amount that corresponds to the difference between the break away loads.

8. The assembling method described in claim 7, wherein the connection strength between the bracket on the column side and the bracket on the vehicle side is increased by adjusting the connecting strength of the other connecting bracket to the top plate section.

9. The assembling method described in claim 7, wherein the connection strength between the bracket on the column side and the bracket on the vehicle side is increased by using a connecting bracket having a pair of restraining plate sections with elasticity that corresponds to the difference in break away loads.

* * * * *